(12) United States Patent
Christoph et al.

(10) Patent No.: US 10,984,789 B2
(45) Date of Patent: Apr. 20, 2021

(54) APPARATUS AND METHOD USING MULTIPLE VOICE COMMAND DEVICES

(71) Applicant: Harman Professional Denmark ApS, Aarhus N (DK)

(72) Inventors: Markus E. Christoph, Straubing (DE); Gerhard Pfaffinger, Regensburg (DE)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 120 days.

(21) Appl. No.: 16/151,996

(22) Filed: Oct. 4, 2018

(65) Prior Publication Data
US 2019/0108837 A1     Apr. 11, 2019

(30) Foreign Application Priority Data

Oct. 5, 2017   (EP) ..................................... 17194991

(51) Int. Cl.
*G10L 15/22*     (2006.01)
*G06F 3/16*      (2006.01)
(Continued)

(52) U.S. Cl.
CPC .............. *G10L 15/22* (2013.01); *G06F 3/165* (2013.01); *G06F 3/167* (2013.01); *G10L 15/30* (2013.01);
(Continued)

(58) Field of Classification Search
CPC ......... G10L 15/22; G10L 15/00; G10L 17/00; G10L 25/84; G10L 13/00; G06F 3/165; G06F 3/167; G06F 16/29; G06F 3/16; G06F 2221/2111; H04R 1/406; H04R 3/005; G04R 3/12; G04S 7/303; H04W 4/029; H04W 4/02; H04W 4/023; H04W 4/021; H04W 4/025; H04W 48/04; H04W 56/006; H04W 64/00; H04W 68/005; H04L 67/22; H04L 67/2814; H04L 51/20
See application file for complete search history.

(56) References Cited

U.S. PATENT DOCUMENTS 10,148,912 B1 *  12/2018  Oliver .................. H04L 12/1822
10,356,362 B1 *   7/2019  Rudberg ................ H04N 7/15
(Continued)

OTHER PUBLICATIONS

European Search Report for Application No. 17194991, dated Mar. 19, 2018, 7 pages.

*Primary Examiner* — Linda Wong
(74) *Attorney, Agent, or Firm* — Artegis Law Group, LLP

(57) ABSTRACT

The present invention provides a method and system with a plurality of voice command devices, wherein each of the voice command devices comprises a processor unit, a transceiver coupled to the processor unit and configured to couple to a network, one or more microphones, each configured to capture an audio signal, and at least one loudspeaker, and wherein the processor unit is configured to detect a speech signal in the captured audio signals; upon detection of a speech signal, transmit directivity information with respect to the one or more microphones to a software as a service, SaaS, provider via the network using the transceiver; and receive directivity information with respect to the plurality of voice command devices from the SaaS provider via the network using the transceiver.

20 Claims, 8 Drawing Sheets

(51) Int. Cl.
  *G10L 15/30*      (2013.01)
  *H04R 3/00*       (2006.01)
  *G10L 25/84*      (2013.01)
  *H04R 3/12*       (2006.01)
  *H04S 7/00*       (2006.01)
  *H04R 1/40*       (2006.01)

(52) U.S. Cl.
  CPC .............. *G10L 25/84* (2013.01); *H04R 1/406* (2013.01); *H04R 3/005* (2013.01); *H04R 3/12* (2013.01); *H04S 7/303* (2013.01); *G10L 2015/223* (2013.01); *H04R 2227/003* (2013.01); *H04R 2227/005* (2013.01); *H04S 2420/11* (2013.01)

(56) References Cited

U.S. PATENT DOCUMENTS

| | | | | |
|---|---|---|---|---|
| 10,735,597 | B1* | 8/2020 | Zagorski | H04L 65/1089 |
| 2005/0253713 | A1* | 11/2005 | Yokota | G08B 13/1672 |
| | | | | 340/566 |
| 2014/0136195 | A1* | 5/2014 | Abdossalami | H04M 3/2236 |
| | | | | 704/235 |
| 2015/0256954 | A1 | 9/2015 | Carlsson et al. | |
| 2016/0088499 | A1* | 3/2016 | Logan | H04L 1/24 |
| | | | | 370/242 |
| 2016/0099499 | A1* | 4/2016 | Ezri | H04B 7/0617 |
| | | | | 343/876 |
| 2016/0330156 | A1* | 11/2016 | Dunne | H04L 51/04 |
| 2016/0353217 | A1 | 12/2016 | Starobin et al. | |
| 2017/0076720 | A1* | 3/2017 | Gopalan | G10L 15/22 |
| 2017/0094464 | A1* | 3/2017 | Chu | H04B 11/00 |
| 2017/0332202 | A1* | 11/2017 | Swirsky | H04W 76/10 |
| 2017/0332343 | A1* | 11/2017 | Vaccari | H04L 67/104 |
| 2017/0359432 | A1* | 12/2017 | Knecht | H04L 67/2814 |
| 2018/0053364 | A1* | 2/2018 | Bhattacharya | G07C 9/00563 |
| 2018/0150129 | A1* | 5/2018 | Thomas | G06F 9/451 |
| 2018/0205691 | A1* | 7/2018 | Osipkov | G06Q 10/107 |
| 2019/0069080 | A1* | 2/2019 | Abrams | G06F 3/165 |
| 2019/0088257 | A1* | 3/2019 | Shah | G06F 3/167 |
| 2019/0222804 | A1* | 7/2019 | Rudberg | H04N 7/15 |

* cited by examiner

APPARATUS AND METHOD USING MULTIPLE VOICE COMMAND DEVICES

CROSS-REFERENCE TO RELATED APPLICATIONS

This application claims the priority of co-pending European patent application titled, "APPARATUS AND METHOD USING MULTIPLE VOICE COMMAND DEVICES" filed on Oct. 5, 2017 and having Ser. No. 17,194,991.0. The subject matter of this related application is hereby incorporated herein by reference.

BACKGROUND

Field of Invention

The present invention relates to an apparatus and method using multiple voice command devices, in particular to an automatic choice of acoustic Cloud devices.

Background of the Invention

Recently, a number of voice operated devices connected to The Cloud or other web service providers have become available on the market. Some examples include Amazon's Echo, Siri on iOS and speech interaction on Android, and the like. These voice command devices operate as front ends for web services, such as streaming audio, music, books, video and other digital content and may be operated by a user using voice commands. A user may ask for instance for certain content to be played over the device. For this purpose, voice command devices are generally equipped with one or several loudspeakers and/or connected to separately provided loudspeakers.

A keyword may be employed to indicate to the system that a voice command follows. For example, and without limitation, Amazon's Echo may be spoken to using the keyword "Alexa" followed by a command "play music". The received audio signal, captured by one or more microphones of the voice command device, is digitized for transmission over a network, e.g. the Internet, to a service provider, in particular using The Cloud. The voice command device may then contact a remote service, which responds with streaming music or delivering the requested data. Interoperability may be provided wherein the remote device or web service asks for clarification of the command. For example, and without limitation, "What music would you like?" may be sent to the voice command device which will pronounce the question using the loudspeakers. The response given by the user and captured by the voice command device is transmitted to the remote device or web service which will then stream the desired music. Speech recognition may be employed by the voice command device and/or the service provider to analyze the captured audio signal for voice commands.

In principle, voice command devices may be triggered independently of the particular location of the user as long as a speech signal can be reliably detected in the captured audio signal. In other words, current day voice command devices usually provide a 360° range for capturing uttered voice commands as well as a 360° range for outputting the audio signal, e.g. music signal, provided by The Cloud.

As long as a single voice command device is used, the problem of locating the user with respect to the voice command device may be handled autonomously by the voice command device. After determining the location of the user, beam steering may be performed between multiple microphones and/or speakers of the voice command device to receive the best possible speech signal from the user and/or to generate a high-quality sound field at the location of the user. As voice command devices become more widespread and inexpensive, users start to equip their households with multiple voice command devices located in the same or different rooms. In addition, audio reproduction quality requested by the user is constantly increasing such that multiple voice command devices may be used to provide stereo or even surround sound reproduction quality.

Provision of multiple voice command devices in various locations, however, requires locating the speaker with respect to each of the voice command devices, wherein the geometry of the acoustic room surrounding the speaker and the voice command devices affects the propagation of audio signals between the speaker and the voice command devices. To capture the best possible speech signal, a large number of combinations of microphones and/or steering angles has to be analyzed between the voice command devices leading to significant time delays when the speaker moves through the room while continuing to voice control the voice command devices. In addition, some of the voice command devices will be better located to capture uttered speech and/or to provide the desired sound field.

An efficient way of selecting the optimum combination of voice command devices of a plurality of voice command devices and/or their corresponding microphones and/or loudspeakers for optimum speech capturing and/or audio reproduction is therefore desirable.

DESCRIPTION OF THE INVENTION

The technical problems described above are solved by a system, in particular an entertainment system, with a plurality of voice command devices, wherein each of the voice command devices comprises: a processor unit, in particular coupled to a memory, a transceiver coupled to the processor unit and configured to couple to a network, one or more microphones, each configured to capture an audio signal, and at least one loudspeaker, wherein the processor unit is configured to detect a speech signal in the captured audio signals, upon detection of a speech signal, transmit directivity information with respect to the one or more microphones to a software as a service, SaaS, provider via the network using the transceiver, and receive directivity information with respect to the plurality of voice command devices from the SaaS provider via the network using the transceiver.

Each of the voice command devices may be provided as a standalone unit wherein the transceiver is operable to communicate over a network, in particular the Internet, for providing music, news and other audio information using voice control. The voice command devices may be identical or different as long as they comprise the above mentioned components. The voice command devices may in particular be arranged at different spatial locations, for instance distributed over one or several rooms of a home. As mentioned above, each of the voice command devices may be configured to operate as a front end for web services such as streaming audio, music, books, video and other digital content provided by a remote service provider using the network.

The processor unit may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known in the art. The processor unit may in particular comprise a CPU, a GPU and/or a digital signal processor (DSP). It may be coupled to a memory such as RAM, ROM, flash memory, solid-state disk, hard disk, optical data storage device, magneto optical data storage device, or any device known in the art that is capable of storing instructions or software and associated data and providing the instructions and any associated data to the processor unit so that the processor unit can execute the instructions.

The processor unit may include dedicated hardware components such as a DSP, an FFT unit, a filtering unit, a beamforming unit, and further units to perform the below described processing of the audio signals. Alternatively or additionally, the processor unit may be configured to execute instructions stored on the memory for performing the operations described below. The voice command devices may in particular include processor-readable instructions encoded on the memory directing the processor unit to perform the below described methods.

According to the present invention, each of the plurality of voice command devices comprises a transceiver which is coupled to the processor unit and configured to transmit and receive data to and from a network. The transceiver may be a wireless transceiver, for instance a WiFi or Bluetooth transceiver or may be a wired transceiver, e.g. using a USB or HDMI port. The transceiver may be configured to couple to a local network, such as a home network, in particular a LAN or WLAN network installed in a user's home. By way of example, the transceiver may be configured to wirelessly couple to a WLAN router provided in a user's home. Alternatively or additionally, the transceiver may be configured to directly connect to a mobile communication network such as a 3GPP network. By providing the physical layer for the connection to the network, the transceiver enables the processor unit to connect to a software as a service, SaaS, provider, e.g. as part of The Cloud, to exchange data with the SaaS provider. This connection may be direct, e.g. via a mobile communication network, or indirectly negotiated using a router as a gateway. Any of the known connectivity standards and protocols may be used to connect to the network and/or exchange data with the SaaS provider.

The term "software as a service" or "SaaS" provider refers to a software delivery model in which software and its associated data are hosted centrally such as on the Internet or The Cloud and accessed by users using a client. In the present case, the client for accessing the SaaS provider is implemented in the voice command device, in particular the processor unit. SaaS is a common delivery model for many business applications, including accounting, collaboration, customer relationship management, management information systems, enterprise resource planning, invoicing, human resource management, content management and service desk management. In the present context, SaaS is in particular a common delivery model for providing entertainment web services, such as streaming or downloading audio, music, audio books, video and other digital content by a remote provider, in particular being part of The Cloud, to the client. The SaaS provider may further comprise a primary service provider and one or more secondary service providers. The primary service provider may in particular provide functionality for processing and analyzing voice commands uttered by a user and captured by the voice command devices and for requesting corresponding data, such as music or video content, from a secondary service provider. Alternatively, the processor unit of the voice command devices may be configured to process and analyze the voice commands at the side of the voice command device and only transmit the result of the analysis to the SaaS provider for further processing.

According to the present invention, each voice command device includes one or more microphones, wherein each microphone is configured to capture an audio signal. The microphones may be any microphone known in the art, either omni-directional or uni-directional. In particular, a plurality of microphones of a voice command device may be implemented as a microphone array, in particular, as a circular or spherical microphone array. In other words, the plurality of microphones may be distributed, in particular equidistantly, over a circle or circumference of the voice command device, or a spherical or hemispherical surface of the voice command device. By way of example, the voice command devices may assume a cylindrical, hemispherical or spherical form factor.

Each microphone is configured to capture an audio signal or microphone signal, wherein the microphone signal may be captured as an envelope signal or a digital signal. In the case of an envelope signal, the audio signal or microphone signal may further be converted into a digital signal by an A/D converter or the processor unit itself. In the presence of a plurality of microphones, the audio signal or microphone signal may be a multi-channel signal. For simplicity, the term "audio signal" is used in the following as a general term for digital signals captured by the microphones, processed by the processor unit and/or transmitted or received to or from the network wherein the audio signal comprises audio data, for instance corresponding to a captured microphone signal or music data provided by the SaaS provider.

The one or more microphones are connected to the processor unit and configured to provide the captured audio signals to the processor unit for further processing. According to the present invention, this further processing in particular includes speech signal processing in order to detect a speech signal in the captured audio signals, wherein the speech signal processing may be carried out by the processor unit, in particular a dedicated DSP, according to any of the methods known in the art. The processing of the captured audio signals may be performed in the time domain and/or the frequency domain or in a frequency sub-band regime. For this purpose, the microphone signal may be subjected to a Fourier transform, in particular, a fast Fourier transform, a Discrete Fourier transform or the like or to filtering by analysis filter banks for transforming the microphone signal into the frequency domain. In practical applications, the microphone signal may be provided as a sampled time-discrete microphone signal rather than a continuous time dependent signal and may further be processed on a frame-by-frame basis, wherein the frame duration may be predetermined or adapted by the speech detection algorithm and may be of the order of 5 to 40 milliseconds.

The speech signal may be detected by applying a voice activity detection (VAD) method to the microphone signal, wherein the voice activity detection method detects the presence or absence of human speech in the captured audio signals. In one basic embodiment of the present invention, detecting a speech signal in the captured audio signal may only comprise discriminating between presence and absence of human speech in the microphone signal without carrying out speech recognition on the microphone signal. According to this basic embodiment, detection of a speech signal may only be used to trigger further processing of the captured audio signals wherein the further processing may in particular be carried out by the SaaS provider. In this case, the voice command device may be configured to transmit the raw audio signals captured by the one or more microphones to the SaaS provider as directivity information with respect to the one or more microphones. The transmitted audio signals are then processed at the side of the SaaS provider by performing the below described speech recognition and calculating directivity information with respect to the plurality of voice command devices.

In an alternative embodiment of the present invention, detecting a speech signal in the captured audio signals may further comprise carrying out speech recognition at the side of the voice command device, i.e. detecting phonemes, words, phrases and/or sentences in the microphone signal. By carrying out speech recognition on the microphone signal, human utterances, which are not verbal utterances, like sneezing, coughing, whistling or the like, are not accidentally detected as a speech signal such that the below described procedure is not involuntarily triggered.

Voice activity detection may be carried out based on measures determined from the microphone signal, wherein the different measures include spectral slope, correlation coefficients, log likelihood ratios, cepstral and weighted cepstral coefficients, which are determined from the Fourier coefficients of the logarithm of the spectral density, as well as modified distance measures, short-time energy, zero-crossing rate, linear prediction coefficients, spectral entropy, a least-square periodicity measure, and wavelet transform coefficients. Voice activity detection may further include a noise reduction stage, e.g. by a spectral subtraction, filtering for echo compensation and/or determining signal coherence of two or more audio signals captured by spaced-apart microphones in order to filter out diffuse background noise and/or sound reflections.

Speech recognition may be carried out according to any of the methods known in the art. In particular, a speech recognition method may be based on hidden Markov models using cepstral coefficients. The employed hidden Markov model may further involve context dependency for phonemes, cepstral normalisation to normalise for different speakers and/or recording conditions, vocal tract length normalisation (VTLN) for male/female normalisation, and/or maximum likelihood linear regression (MLLR) for more general speaker adaptation. Aside from using the coefficients alone, their temporal dynamics may be included using so-called delta and delta-delta coefficients. Alternatively, splicing and an LDA-based projection followed perhaps by heteroscedastic linear discriminant analysis (HLDA) may be used. A speech recognition system based on hidden Markov models may further be adapted using discriminative training techniques, such as maximum mutual information (MMI), minimum classification error (MCE) and minimum phone error (MPE). As an alternative to hidden Markov models, the speech recognition method may be based on dynamic time warping (DTW). Also, neural networks may be used for certain aspects of speech recognition such as phoneme classification, isolated word recognition and speaker adaptation. Further, neural networks may be used as a pre-processing step to the actual speech recognition step. Other methods, which may be used for detecting a speech signal in the microphone signal using speech recognition include, but are not limited to, power spectral analysis (FFT), linear predictive analysis (LPC), wherein a specific speech sample at a current time can be approximated as a linear combination of past speech samples and wherein the predictor coefficients are transformed to cepstral coefficients, perceptual linear prediction (PLP), which is based on the short term spectrum of speech and uses several psycho-physically based transformations, mel scale cepstral analysis (MEL), wherein the spectrum is warped according to the MEL scale and wherein cepstral smoothing is used to smooth the modified power spectrum, relative spectra filtering (RASTA) to compensate for linear channel distortions, which can be used either in the log spectral or cepstral domains, and energy normalisation to compensate for variances in loudness, in the microphone recording as well as in the signal energy between different phoneme sounds.

Finally, statistical language modelling may be used for speech recognition, wherein a statistical language model assigns probability distributions to words and sentences of a language. In statistical language modelling, at least one of the spoken words is recognised on the grounds of one or more recognised preceding words. An example for statistical language modelling may be given, for instance, by the well-known n-gram language modelling.

The speech detection may be carried out continuously on a frame-by-frame basis, or with a predetermined, possibly configurable, frame-size, respectively overlap, for instance once every 500 ms or every second. In addition, the processor unit may be adapted to periodically or continuously check for a speech signal in the captured audio signals.

Detecting a speech signal may further comprise detecting speech activity of at least two different human speakers using voice recognition based on speaker recognition methods. While speaker recognition generally denotes the art of identifying the person who is speaking by characteristics of their voices, so-called biometrics, voice recognition according to the present embodiment may be limited to detecting that speech signals of at least two different human speakers are comprised in the detected speech signal. This may be achieved by a spectral analysis of the speech signal and by identifying at least two different spectral characteristics of the speech signal, without comparing the detected spectral characteristics and/or voice biometrics to predetermined spectral characteristics and/or voice biometrics associated with a specific person. The speech signals of the at least two different human speakers may be contained in the detected speech signal at the same time, i.e. when at least two different human speakers utter verbal sounds simultaneously, or may be contained in the detected speech signal in different, possibly consecutive and/or overlapping, time intervals of the detected speech signal, i.e. in the case of an actual conversation between the at least two human speakers. The speaker recognition or speaker differentiation may be carried out using frequency estimation, hidden Markov models, Gaussian mixture models, pattern matching algorithms, neural networks, matrix representation, vector quantization, decision trees, a sequence of covariance lags of the spectral density of the signal, an autoregressive moving-average (ARMA) model, a spectral analysis based on the pitch of the detected speech signal, a detection of formants in the spectrum, or any other spectral characteristics as known in the art.

Speaker recognition may be used by the voice command device and/or the SaaS provider to authorize operation of the voice command device. In the context of the present invention, detecting speech signals of at least two different human speakers may, however, be also used by the inventive system to perform beamforming with respect to the at least two different speakers for the plurality of microphones and/or the loudspeakers of the voice command devices.

Detecting the speech signal may further comprise subtracting a signal based on an audio signal output by the at least one loudspeaker from the captured audio signals. In order to avoid an erroneous detection of a speech signal contained in audio data received by the voice command devices from the SaaS provider and output by the loudspeakers of the voice command devices, the corresponding audio signal, potentially after processing, can be subtracted from the captured audio signals or microphone signals.

In one particular embodiment, the signal to be subtracted from the microphone signal may be determined from the output audio signal using an acoustic transfer function for the transfer of the audio signal from the at least one loudspeaker to the one or more microphones. The acoustic transfer function describes the relationship between the output, here the audio signal as captured by the one or more microphones, and the input, here the audio signal as to be output via the at least one loudspeaker, in a linear time invariant system, here the acoustic space formed by the at least one loudspeaker and the one or more microphones. In a closed acoustic space, like a room of a home, the audio signal as captured by the one or more microphones generally does not only include the acoustic waves reaching the one or more microphones directly from the at least one loudspeaker, but also reflections and reverberations off objects/subjects inside the acoustic space and off limiting structures of the acoustic space. For a well-defined acoustic space, such as a room, the acoustic transfer function may be predetermined by the voice command devices and stored in a storage medium.

According to the present invention, the determination may be carried out by the SaaS provider based on captured audio signals from all voice command devices of the entertainment system and the data may be stored in a storage medium of the SaaS provider and/or the voice command devices. The acoustic transfer function may in particular be determined in a calibration step prior to the detection of a speech signal by the use of reference signals output by the at least one loudspeaker of the voice command device and captured by the one or more microphones. This calibration step may be performed by the SaaS provider and may involve reference signals output by individual voice command devices or combinations of the voice command devices being part of the entertainment system. In other words, the SaaS provider may transmit dedicated audio signals to the voice command devices of the entertainment system to automatically/adaptively model the acoustic transfer function from the loudspeaker arrangement of the voice command devices to the microphone arrangement of the voice command devices. This calibration step may be performed without any knowledge of the room geometry or the spatial distribution of the voice command devices or may involve the input and transmission of corresponding calibration data by a user to the SaaS provider. To this end, the voice command devices may include an input device such as a touch screen or a keyboard with corresponding screen.

The signal to be subtracted from the captured audio signals may then be determined by filtering the audio signal to be output via the at least one loudspeaker using a digital or analogue filter, which is characterized by the acoustic transfer function. By filtering the audio signal to be output via the at least one loudspeaker accordingly, any audio signal output via the at least one loudspeaker, whether speech signal or not, may be efficiently subtracted from the microphone signal, such that the remaining microphone signal ideally only comprises audio signals from external sources, i.e. not from the at least one loudspeaker, as for instance uttered by a human speaker and combined with a general background noise. From the remaining microphone signal, a speech signal may then be detected efficiently and reliably.

Detecting a speech signal from the remaining microphone signal may, in particular, comprise comparing a signal-to-noise ratio of the speech signal with a predetermined threshold and determining that the speech signal is detected if the signal-to-noise ratio is greater than the predetermined threshold. This comparison of the signal-to-noise ratio with the predetermined threshold may be carried out before performing the actual speech detection and/or speaker recognition as described above, such that required computational resources may be reduced. In particular, the signal-to-noise ratio comparison may be performed by the voice command devices themselves while the actual speech recognition and analysis, e.g. with respect to speaker localization as described below and identification of voice commands in a detected speech signal is performed by the SaaS provider. In this case, a signal-to-noise ratio greater than the predetermined threshold is a prerequisite for the below described transmission and reception of directivity information.

The voice command devices may comprise a dedicated speech detection unit, such as a DSP, configured to receive the captured audio signals, i.e. the microphone signal, from the one or more microphones and to perform the above described methods to detect a speech signal in the captured audio signals. The speech detection unit may be provided as a separate unit or as part of the processor unit. The speech detection unit may be implemented in the form of an integrated circuit and/or in the form of computer executable instructions for performing the above described methods and stored in a memory or on a computer readable medium. The processor unit may be implemented in the form of a central processing unit, typically a CPU or GPU or in the form of an application-specific integrated circuit (ASIC).

The voice command devices may further comprise one or several A/D converters for converting an analogue audio signal captured by the plurality of microphones to a digital audio signal, one or several filtering units for filtering the captured audio signals before transmitting them to the SaaS provider or further processing them in the processor unit, one or several filtering units for filtering received audio signals being part of an audio service provided by the SaaS provider before outputting them via the at least one loudspeaker, an equalizer for applying equalization to the received audio signals before outputting them via the at least one loudspeaker, one or several amplifiers for amplifying captured audio signals and/or audio signals received from the network, and one or several D/A converters for converting a digital audio signal back to an analogue audio signal for output via the at least one loudspeaker. Further components as known in the art may be provided as part of the voice command devices, in particular as part of their processor units.

According to the present invention, the processor unit of the voice command devices is further configured to transmit directivity information with respect to the one or more microphones to an SaaS provider via the network using the transceiver. In return, the voice command devices receive directivity information with respect to the plurality of voice command devices from the SaaS provider via the network using the transceiver.

Detection of a speech signal, e.g. as a positive result of the comparison of a signal-to-noise ratio of a speech signal with a predetermined first threshold by the processor unit, thus triggers the exchange of directivity information between one or several voice command devices on the one side and the SaaS provider on the other side. The exchange of the directivity information is performed using the transceivers of the voice command devices and mediated by the network. Any of the known transmission methods and protocols may be applied to the exchange of the directivity information.

In the present context, directivity information generally refers to digital data which comprises at least some information on the relative location of at least one source of the detected speech signal with respect to one or several of the voice command devices. In the case of the directivity information with respect to one or more microphones, this information on the relative location relates to the specific voice command device which comprises the respective one or more microphones. The directivity information with respect to the one or more microphones therefore only comprises information on the spatial location of the at least one source of the speech signal with respect to one specific voice command device. In other words, the directivity information with respect to the one or more microphones comprises information on the relative location of the at least one source of the detected speech signal which takes into account only the audio signals captured by the one or more microphones of a specific voice command device, but does not take into account audio signals captured by microphones of the other voice command devices.

In contrast, the directivity information with respect to the plurality of voice command devices comprises information on the relative location of the at least one source of the detected speech signal with respect to two or more of the voice command devices. This directivity information may be provided as explicit information, e.g. in the form of beam steering angles with respect to the plurality of voice command devices and to the at least one source of the detected speech signal, or encoded into audio data provided by the SaaS provider as part of an audio service, e.g. by encoding individual audio channels for the loudspeakers of the plurality of voice command devices to create a surround sound or Ambisonics sound. In other words, the directivity information with respect to the plurality of voice command devices includes information on the relative location of the at least one source of the detected speech signal which takes into account audio signals captured by microphones of two or more voice command devices. In particular, the directivity information with respect to the plurality of voice command devices may take into account all audio signals captured by microphones of the voice command devices with a signal-to-noise ratio of a detected speech signal above a predetermined threshold.

The result of a localization of a source of a detected speech signal based on audio signals captured by the microphones of a single voice command device is generally less reliable than the result of a localization of the source based on audio signals captured by microphones of multiple voice command devices. Determination of directivity information with respect to the plurality of voice command devices based on audio signals captured by microphones of multiple voice command devices at the side of the SaaS provider may therefore include a correction of the location of the at least one source of the detected speech signal which was calculated either by the voice command device itself or the SaaS provider based on the audio signals captured by the microphones of the voice command device only. Alternatively, the directivity information with respect to the plurality of voice command devices may be determined by the SaaS provider without a preceding localization of the source of the detected speech signal based on the captured audio signals of a single voice command device. This may in particular be the case if a voice command device only comprises a single microphone. In this case, the directivity information with respect of the one or more microphones of that voice command device may include the captured audio signal itself, as also described below. In addition to the improved reliability of the source localization based on captured audio signals from two or several voice command devices, in particular from all of the plurality of voice command devices, the SaaS provider generally provides better computing resources and better performance for the time-consuming determination of the directivity information with respect to the plurality of voice command devices. Depending on the available network connection, in particular a short round-trip delay, the location of a speaker moving through the acoustic space, i.e. through the room or a plurality of rooms, can be tracked according to the present invention such that capturing of voice commands and audio reproduction related to the audio service can be optimized.

In one embodiment, the directivity information with respect to the plurality of voice command devices comprises at least one of selection information for a selecting at least one of the plurality of voice command devices as an active voice command device, microphone selection information for selecting at least one microphone, and beamforming information with respect to at least two microphones. According to this embodiment, the directivity information with respect to the plurality of voice command devices comprises directivity information with respect to the capturing of audio signals using the combined microphones of the plurality of voice command devices.

As described above, the voice command devices of the entertainment system are distributed over various spatial locations inside an acoustic space, which may for instance be a room or a sequence of rooms in a home. Without limitation, the acoustic space may also be constituted by the cabin of a vehicle, such as a car or a truck. As the voice command devices are located at different locations inside the acoustic space, some of them will be located in a better location for capturing a speech signal from a user, for instance by being located closer to the temporary position of the user. Also, objects inside the acoustic space, such as furniture, walls or other large objects, may partially block propagation of sound waves from the speaker to particular voice command devices. As a result, only a subgroup of the voice command devices or even a single voice command device may be selected for capturing audio signals emitted by the user. Such selected voice command devices are termed active voice command devices or active devices in the terminology of the present invention.

A voice command device selected as an active voice command device according to the selection information included in the directivity information provided by the SaaS provider continues to monitor captured audio signals for speech signals and may further be selected as an audio reproduction device for an audio service provided by the Saas provider. Other voice command devices which are not selected as active voice command devices according to the selection information may continue receiving audio signals and checking the captured audio signals for a speech signal but are generally not used for beamforming the plurality of microphones or participating in the above mentioned audio reproduction. In a specific embodiment, voice command devices which are not selected may be deactivated to preserve energy.

The directivity information with respect to the plurality of voice command devices may comprise microphone selection information for selecting at least one microphone. The microphone selection information may select at least one microphone of a plurality of microphones of a specific voice command device or one or several microphones of different voice command devices. Selecting a microphone of a specific voice command device may in particular include selecting the corresponding voice command device as an active voice command device. As a consequence of the microphone selection information being provided to one or several of the plurality of voice command devices, the ensemble of microphones formed by the selected microphones is used to monitor utterances of the localized at least one speaker, and optionally audio reproduction may be performed using the at least one loudspeaker of the corresponding voice command devices.

Alternatively or additionally, the directivity information with respect to the plurality of voice command devices may comprise beamforming information with respect to at least two microphones. The at least two microphones may belong to a plurality of microphones of a specific voice command device or belong to different voice command devices. Based on the beamforming information provided by the SaaS provider to the corresponding voice command devices, beamforming of the at least two microphones may be performed when capturing audio signals from the at least one speaker. The beamforming information may in particular include at least one steering angle for two-dimensional or three-dimensional beam steering, depending on the spatial arrangement of the microphones of the plurality of voice command devices. If a plurality of microphones is arranged along a circumference of a 360° voice command device, particularly along a circle, a single steering angle for two-dimensional beam steering may be included. If the plurality of microphones is arranged on a hemisphere or a spherical surface, two steering angles for three-dimensional beam steering may be included.

Beamforming of a plurality of microphones is generally known such that a detailed description of beamforming methods known in the art is omitted here for clarity. In general, beamforming is a signal processing technique used to control the directionality of a reception or emission of an acoustic signal and is usually achieved by a filtering step or a processing step on fully transformed signals. In the present case, beamforming of the at least two microphones may be used to make the at least two microphones behave as a single directional microphone and to steer an acoustic beam toward the speaker in order to maximize the reception in the direction of the speaker and to attenuate unwanted sounds coming from any other direction. Beamforming may be applied to multiple microphones of a single voice command device and/or an ensemble of microphones of multiple voice command devices, even if each voice command device only has a single microphone. By way of example, a time delay compensation may be applied to the audio signals captured by the at least two microphones to compensate for different transit times from the source of the speech signal, i.e. the speaker, to the respective microphone. Furthermore, filtering techniques, like echo and noise compensation, may be applied to the processed audio signals to remove unwanted reflections of the speech signal and noise from the processed signals. By applying different weights and/or phase shifts to the audio signals captured by the individual microphones, an acoustic subspace or sweet spot may be defined as a limited space inside the acoustical room from which audio signals are preferably received due to constructive interference of the individual microphone signals while audio signals from outside the acoustic subspace are at least partially cancelled or filtered out. As a result, voice commands uttered by the localized speaker can be captured by the at least two microphones with a significantly improved signal-to-noise ratio.

The beamforming, i.e. the corresponding processing may be partially applied at the side of the active voice command devices, i.e. by using their processor units, based on the directivity information received from the SaaS provider, e.g. by applying respective time delays, weights and/or phase shifts to the audio signals captured by the some or all microphones and transmitting the preprocessed audio signals to the SaaS provider. Beamforming steps requiring all audio signals captured by the at least two microphones may then be applied to the received preprocessed audio signals at the side of the SaaS provider. In particular, beam steering of two or more microphones of a plurality of microphones of an active voice command device may be performed at the side of the voice command device using the directivity information received from the SaaS provider. As a result, the amount of data transmitted to the SaaS provider can be reduced and the quality of the detected speech signal may be enhanced such that speech recognition being performed at the side of the SaaS provider becomes more successful.

The directivity information comprising selection information, microphone selection information and/or beamforming information is determined by the SaaS provider based on directivity information with respect to the one or more microphones received from at least one voice command device. In particular, the directivity information with respect to the plurality of voice command devices is determined by the SaaS provider based on directivity information with respect to the one or more microphones received from several, in particular all of the voice command devices of the entertainment system.

In one further embodiment, the directivity information with respect to the one or more microphones may comprise a signal-to-noise ratio (SNR) calculated by the processor unit for the speech signal with respect to each of the one or more microphones and/or with respect to a plurality of different beamforming directions of a plurality of microphones if present in the voice command device. According to this embodiment, the directivity information transmitted by a voice command device comprises information on a location of the at least one source of the detected speech signal calculated by the voice command device based on the audio signals captured by the one or more microphones.

The directivity information may in particular comprise a signal-to-noise ratio for the speech signal with respect to each of the captured audio signals. Signal-to-noise ratios below a predetermined threshold may be transmitted to the SaaS provider or omitted from the directivity information. The signal-to-noise ratios may be calculated by the processor unit of the voice command device according to any of the methods known in the art.

The signal-to-noise ratio may be calculated with respect to a single microphone signal, i.e. an audio signal captured by a single microphone only. The calculation of the signal-to-noise ratio is thus in particular performed without applying beamforming to the captured audio signals. The calculation may be, however, performed after elimination of an audio signal output by the at least one loudspeaker from the captured audio signals.

Alternatively or additionally, a separate signal-to-noise ratio may be calculated by the processor unit for the speech signal with respect to a plurality of different beamforming directions of a plurality of microphones if present in the voice command device. In this case, the processor unit performs beamforming on the captured audio signals with respect to a number of different beamforming directions, either two-dimensionally or three-dimensionally, depending on the spatial arrangement of the plurality of microphones. The different beamforming directions may be equidistantly distributed over a segment of a circle or a segment of a sphere of interest or a complete circle or complete sphere. The segment of interest may be predefined in the voice command devices based on the relative arrangement of the voice command device, in particular its microphones, with respect to a spatial area wherein a human may be present. The number and/or distribution of beamforming directions for the calculation of the signal-to-noise ratios may be predetermined, adaptively determined by the voice command device depending on a result of the calculation or determined by the SaaS provider and transmitted to the voice command device.

For each of the beamforming directions, a signal-to-noise ratio is calculated by the voice command device and reported via the transceiver to the SaaS provider together with information identifying the beamforming direction, such as a corresponding beamforming angle.

From the transmitted signal-to-noise ratios, i.e. with respect to the one or more microphones and/or the plurality of different beamforming directions, received from the voice command devices of the entertainment system, the SaaS provider may determine the above described selection information for selecting active voice command devices, the microphone selection information for selecting microphones, and/or beamforming information with respect to at least two microphones. In detail, the SaaS provider may select those voice command devices with signal-to-noise ratios above a second, predetermined threshold as active voice command devices. This selection may for instance be based on signal-to-noise ratios with respect to a plurality of different beamforming directions. Alternatively, a voice command device with at least one microphone with a signal-to-noise ratio exceeding the second threshold may be selected as an active voice command device. Microphones of an active voice command device whose signal-to-noise ratio exceeds a third threshold may be selected in the microphone selection information. The third threshold may be identical to the second threshold. Alternatively, an optimum beamforming direction may be selected for the one or more microphones of each active voice command device wherein the SaaS provider may calculate beamforming information with respect to the at least two microphones for the directivity information with respect to the plurality of voice command devices based on the optimum beamforming directions provided with the directivity information with respect to the one or more microphones from multiple voice command devices.

For calculating the signal-to-noise ratios, the captured and possibly beamformed audio signals may first be submitted to a high-pass filter to block signal parts that are typically heavily overlaid by noise on the one hand and do not contain parts of the desired speech signal. Optionally, a low-pass filter may be applied to block signal parts outside a typical speech spectrum. The background noise may then be estimated using a non-linear smoothing filter. Based on the processed audio signal and the estimated background noise signal, a signal-to-noise ratio can be calculated which can be compared with a predetermined signal-to-noise threshold. This comparison may be performed by the voice command device or the SaaS provider. By applying corresponding weights and/or phase shifts to the captured audio signals of a plurality of microphones, the signal-to-noise ratios of correspondingly beamformed signals with respect to the plurality of beamforming directions can be calculated. In one embodiment, the calculation is transformed into the spectral domain which allows application of much higher signal-to-noise thresholds as individual formants can be found in certain bins, which by far exceed the background noise level.

The above-described methods may be extended to the detection of speech signals from two or more spatially separated speakers. In this case, separate microphones or groups of microphones, even separate voice command devices or groups of voice command devices may be selected by the SaaS provider to enable optimum capturing of the speech signals from the two or more speakers by the active voice command devices. Also, the at least two microphones may be subjected to beamforming according to the location of the two or more speakers. Generally, a voice command device with several microphones will include a sufficient number of microphones to allow beamforming of the plurality of microphones in the direction of at least two speakers. The directivity information with respect to the one or more microphones and the directivity information with respect to the plurality of voice command devices may be extended accordingly.

In one further embodiment, the directivity information with respect to the one or more microphones may comprise direction-of-arrival (DOA) information estimated by the processor unit based on the captured audio signals. According to this embodiment, the processor unit of a voice command device with a plurality of microphones is configured to perform localization of the source of a detected speech signal in terms of a determination of a direction-of-arrival.

The location of the source of a speech signal may be determined, for instance, by analyzing temporal sampling signals of the microphones constituting the plurality of microphones of the voice command device or their Fourier transforms. The direction-of-arrival (DOA) angle of the speech signal is then computed as a function of the delay between the individual captured audio signals. Such a delay may be computed by a cross-correlation of the different microphone signals. Alternatively, the direction in which the source is located may be determined by other means than by source localization, e.g., based on predetermined scanning angles for a specific acoustic space. For instance, the above described plurality of different beamforming directions may be analyzed by the processor unit with respect to a signal-to-noise ratio of the speech signal and the beamforming direction with the highest signal-to-noise ratio may be determined as the direction-of-arrival.

According to the present embodiment, each voice command device with a plurality of microphones that detects a speech signal transmits the calculated direction-of-arrival information to the SaaS provider via the network. From the transmitted DOA information, the SaaS provider may determine the location of a speaker, the so-called sweet spot, for instance by determining intersections between the DOA beams. If more than two DOA beams are available, a signal-to-noise ratio of the detected speech signal may be applied as a weight when determining intersections of the DOA beams and the sweet spot may be determined as the geometric center of the resulting intersection points.

Every voice command device that reported DOA information with respect to a source of a speech signal may be determined as an active voice command device by the SaaS provider. Furthermore, beamforming information with respect to the microphones of the active voice command devices may be calculated by the SaaS provider based on the reported DOA information and a calculated sweet spot, and reported back to the active voice command devices as part of the directivity information with respect to the plurality of voice command devices.

In one further embodiment, the directivity information with respect to the one or more microphones may comprise the captured audio signals, generally after pre-processing, such as sampling, conversion into digital signals and optionally filtering, smoothing and/or noise cancellation, wherein the directivity information with respect to the plurality of voice command devices comprises DOA information calculated by the SaaS provider based on the captured audio signals from at least two voice command devices.

In this embodiment, the SaaS provider performs the above described determination of DOA beams with respect to a plurality of microphones of the corresponding voice command devices which come with a plurality of microphones and/or with respect to the ensemble of the microphones of those voice command devices that transmitted captured audio signals. This method is therefore also applicable for voice command devices with a single microphone only as the SaaS provider may determine DOA beams with respect to the plurality of voice command devices. As in the previous embodiment, the procedure may take into account spatial information on the relative location of the voice command devices as provided to the SaaS provider in a setup procedure or during an initial calibration procedure to determine a sweet spot of the speaker with respect to the voice command devices. The directivity information returned by the SaaS provider may include DOA information with respect to the microphones of the at least two voice command devices. The received directivity information may be used by the at least two voice command devices to steer a microphone beam in the direction indicated by the DOA information and/or to perform audio reproduction with an optimum sound field at the location of the sweet spot.

Processing the captured audio signals at the side of the SaaS provider increases network traffic but reduces the computational load on the voice command devices such that simplified versions of the voice command devices may be used.

In one further embodiment, the voice command devices may be further configured to receive an audio service comprising at least one audio signal from the SaaS provider and to output the audio signal through the at least one loudspeaker based on the received directivity information with respect to the plurality of voice command devices.

According to the present invention, each voice command device comprises at least one loudspeaker. The at least one loudspeaker may be any loudspeaker known in the art. In particular, the audio signal may be output via a system of loudspeakers comprising multiple full range speakers and at least one subwoofer or woofer. The system of loudspeakers may be further adapted to provide stereo sound, surround sound, virtual surround sound or Ambisonics sound as described further below. In particular, a plurality of loudspeakers may be arranged along a circumference, in particular a circle, of the voice command device or distributed over a hemisphere or sphere being part of the voice command device. With respect to audio reproduction, the voice command devices may in particular be formed as 360° devices which allow emission of sound waves in all directions in a horizontal plane.

Here and in the following, it is assumed that a fixed spatial relationship exists between the location of the one or more microphones and the at least one loudspeaker of each voice command device and that this spatial relationship is known to the respective voice command device and/or transmitted to the SaaS provider. As a consequence, the processor unit of the respective voice command device may use the known spatial relationship to perform audio reproduction of an audio signal received from the SaaS provider based on the received directivity information with respect to the plurality of voice command devices.

In one particular embodiment, only voice command devices selected as active devices in the directivity information provided by the SaaS provider may perform the audio reproduction. As a result, voice command devices which are too far from the listener, which in the present invention is identical to the speaker, or whose output is screened by a large object or a wall, are not selected in this embodiment for audio reproduction to preserve energy and to not disturb occupants of other areas or rooms. In an alternative embodiment, voice command devices may also be selected for audio reproduction which are not selected as active devices. This may be done by the SaaS provider based on the relative spatial arrangement of the voice command devices with respect to the detected source of a speech signal. As a consequence, even voice command devices which are not selected as active voice command devices for capturing the speech signal may still be used for audio reproduction, for instance to play side-channel signals, if they are identified by the SaaS provider as suitably located. Based on the detected location of the speaker/listener, the SaaS provider may for instance select further voice command devices for audio reproduction if sound output by these voice command devices can directly or indirectly reach the ears of the listener. The SaaS provider may further take room geometries into account when selecting additional voice command devices for audio output and also create separated audio zones for two or more detected persons by explicitly not selecting particular voice command devices based on the location with respect to these additional persons to not disturb them. To create a sound zone with a desired sound quality at the location of the detected speaker, directivity information with respect to the plurality of voice command devices can also be sent to these additional voice command devices or all of the plurality of voice command devices by the SaaS provider. Such directivity information may comprise selection information with respect to audio reproduction.

The audio signal to be output by the active voice command devices and possibly additional voice command devices selected for audio reproduction may be any audio signal related to an audio service provided by the SaaS provider. In the following, audio reproduction via the active voice command devices is described. It shall be understood, however, that the described method may easily be extended to additional voice command devices selected by the SaaS provider for audio reproduction as described above. In particular, the audio signal may be a single channel or multi-channel audio signal representing audio data related to a piece of music, an audiobook, audio data of a video, a digital broadcast, a podcast, a telephone connection, or any kind of audio-based service which may be provided by an SaaS provider. The audio signal transmitted to the active voice command devices may comprise dedicated audio signals for each active voice command device and/or each loudspeaker of the active voice command devices. In addition, if at least one voice command device is connected to one or more external loudspeakers, such as the loudspeakers of a TV set, the audio signal transmitted to this voice command device may further comprise audio signals dedicated to the external loudspeakers. In this case, configuration information, such as relative spatial information of the external loudspeakers with respect to the voice command device may be stored by the voice command device and transmitted to the SaaS provider via the network.

In one particular embodiment, outputting the audio signal comprises beamforming the audio signal based on the received directivity information. Based on the received directivity information with respect to the plurality of voice command devices, one or several voice command devices may generate dedicated audio signals for output by the at least one loudspeaker based on the received audio service. By way of example, the directivity information may include phase shift information and/or weights to be applied to the audio signal received from the SaaS provider for each of the at least one loudspeaker of an active voice command device. If the active voice command device comprises multiple loudspeakers, in particular in the form of a 360° array of loudspeakers, beam steering of the output in the direction of the location of the speaker may be performed. As the directivity information with respect to the plurality of voice command devices is provided by the SaaS provider, phase shift information and/or weights for loudspeakers of several voice command devices may be provided to these voice command devices to output correspondingly modified audio signals such that the resulting audio signal from the voice command devices is steered to the sweet spot of the listener. In other words, the directivity information transmitted from the SaaS provider to at least two active voice command devices may be used to generate an optimum sound field at the location of the listener, for instance by positive interference of audio signals output by the loudspeakers of the at least two active voice command devices.

Also, the directivity information received from the SaaS provider may comprise direction-of-arrival information which may be used by an active voice command device with a loudspeaker array to perform beam steering in the direction of the localized listener.

The processor unit of the active voice command device may in particular transform the beamforming information with respect to the at least two microphones into corresponding beamforming information with respect to the at least one loudspeaker using the spatial relationship between the location of the one or more microphones and the location of the at least one loudspeaker. This transformation may also be performed by the SaaS provider, in particular for the case that two or more voice command devices are used for audio reproduction, and the corresponding beamforming information with respect to the loudspeakers used for the audio reproduction may be transmitted by the SaaS provider to the active voice command devices as part of the directivity information with respect to the plurality of voice command devices.

As an alternative to performing beam steering processing of the audio outputs at the side of the active voice command devices, the directivity information with respect to the plurality of voice command devices may also be encoded in the audio signals transmitted by the SaaS provider to the active voice command devices to perform beamforming on the output audio signals. In other words, the audio service provided by the SaaS provider already comprises dedicated audio signals for the loudspeakers of the active voice command devices wherein these dedicated audio signals have been pre-processed by the SaaS provider in terms of applying a respective phase shift and/or weight to the audio signals such that outputting the received audio signals by the loudspeakers of the active voice command devices creates a desired sound field at the position of the listener by beamforming. Encoding the directivity information in the audio signals provided to the active voice command devices automatically performs beamforming on the output audio signals. As the SaaS provider possesses all necessary information, i.e. the collection of directivity information with respect to the one or more microphones of the active voice command devices and, if necessary, information on the relative spatial arrangement of the one or more microphones with respect to the at least one loudspeaker and/or of the plurality of voice command devices with respect to the room geometry, generating modified audio signals for beamforming during audio reproduction at the side of the SaaS provider significantly reduces the required computing resources at the side of the voice command devices.

In one further embodiment, the audio service may comprise a plurality of audio channels associated with different loudspeakers of the plurality of voice command devices to provide stereo sound, surround sound, virtual surround sound or Ambisonics sound. According to this embodiment, the acoustic data which is output by different loudspeakers may differ in terms of content such that the impression of virtual separated sound sources is created at the location of the listener by superposition of the audio signals output by the different loudspeakers.

In the simplest case, the effect of stereo sound is created by providing a left audio channel and a right audio channel to at least two spatially separated loudspeakers. The at least two spatially separated loudspeakers may in particular belong to different voice command devices. If the relative location of these voice command devices in the acoustic space, in particular with respect to the listener, is known to the SaaS provider, e.g. as a result of the above described setup procedure or calibration procedure, the SaaS provider may provide the left audio channel and the right audio channel to the respective loudspeakers of the active voice command devices wherein the left and right audio channels may further be modified using the above described beamforming to generate an optimum sound field at the location of the listener. This additional modification may also compensate for a suboptimal arrangement of the active voice command devices in the room. In addition, the modification may take the geometry of the room, in particular reflections off the walls of the room, into account when generating the audio channels for an optimum stereo impression at the location of the listener.

Higher order sound effects are also possible depending on the type and number of loudspeakers provided with the voice command devices. By way of example, the at least one loudspeaker of a voice command device may include woofers, broadband loudspeakers, midrange loudspeakers and/or so-called tweeters. Depending on the number of available loudspeakers and their spatial arrangement with respect to the location of the listener, i.e. the detected source of the speech signal, surround sound or virtual surround sound may be generated at the location of the listener by providing a multi-channel audio signal as part of the audio service provided by the SaaS provider. The SaaS provider may route multiple audio channels to loudspeakers of the active voice command devices wherein the SaaS provider identifies the optimum combination of loudspeakers of the plurality of voice command devices based on the directivity information with respect to the plurality of microphones received from the plurality of voice command devices.

In particular, the SaaS provider may be configured to identify at least 6 loudspeakers to provide surround sound at the sweet spot according to the 5.1 ITU (International Telecommunication Union) standard. The present invention is, however, not limited to this particular format of surround sound but may be applied to any of the surround speaker configurations known in the art, such as the 7.1 surround speaker configuration. After identification of suitable loudspeakers of the active voice command devices, the SaaS provider may transmit a separate audio channel to each of the identified loudspeakers. If more than one loudspeaker is used at a voice command device, a multi-channel signal may be transmitted to the voice command device. In most cases, each source channel is mapped to a dedicated loudspeaker by the SaaS provider when encoding the audio channels transmitted to the voice command devices. The voice command devices may comprise a matrix unit configured to recover the number and content of the source channels encoded in the multi-channel audio signal received from the SaaS provider and apply them to their respective loudspeakers.

Further information such as beamforming information may be encoded by the SaaS provider in the transmitted audio signals as described above, in particular if more than one loudspeaker is available for at least one channel of the surround sound system.

The SaaS provider may further encode virtual surround sound information in the plurality of audio channels provided with the audio service to the active voice command devices. To generate a virtual surround sound effect at the location of the listener, a head-related transfer function may be taken into account by the SaaS provider to generate audio channels which, when output by the loudspeakers of the active voice command devices, make the listener perceive sound from virtual sources in the acoustic space. Also, the SaaS provider may provide audio channels for directing a strong beam of sound to reflect off the walls of a room so that the listener hears the reflection at a higher level than the sound directly front the loudspeakers. Any of the information required for a virtual surround sound effect at the location of the listener, including control signals for selecting and controlling individual loudspeakers of the active voice command devices, may be transmitted by the SaaS provider to the active voice command devices and in particular, be encoded in the audio channels which constitute the audio service. The voice command devices may comprise a corresponding decoding unit which extracts the control signals from the received audio service and may control its loudspeakers to output the corresponding audio channels.

In one particular embodiment, the audio service may comprise a plurality of audio channels associated with different loudspeakers of the plurality of voice command devices to provide ambisonics sound. Ambisonics sound effects are well known in the art such that a detailed description is omitted here. In general, Ambisonics refers to an audio reproduction technique using a multi-channel mixing technology which re-creates the sound field as it existed in the space when the Ambisonics sound was recorded. In contrast to traditional surround systems, which can only create illusion of the sound field if the listener is located in a very narrow sweet spot between loudspeakers, the sound field created using Ambisonics techniques may fill a larger area, sometimes even the entire acoustic space. With 4 or more speakers arranged around the listener, a three-dimensional sound field can be presented.

By way of example, three-dimensional higher order loudspeakers may be created using 4 or more lower-order loudspeakers that are regularly distributed on a sphere or hemisphere. With a spherical or hemispherical distribution of the at least one loudspeaker of the voice command devices, an Ambisonics sound field may be created. Also, loudspeakers from different voice commands devices may be used to create an Ambisonics sound field. Even a two-dimensional arrangement of the loudspeakers of each voice command device may be used to create an Ambisonics sound field if the voice command devices are located at different heights above the floor of the acoustic space. As a result, a three-dimensional wave field may be generated using two or more voice command devices with two-dimensional arrangements of loudspeaker arrays according to the present invention.

To create an Ambisonics sound field at the location of the detected speaker, the SaaS provider may generate a multi-channel audio signal wherein dedicated audio channels are provided to selected loudspeakers of the active voice command devices. In this context, the directivity information with respect to the plurality of voice command devices transmitted by the SaaS provider to the active voice command devices may further include selection information for selecting loudspeakers of the active voice command devices for output of dedicated audio channels. The SaaS provider may be configured to determine a subset of the loudspeakers of the voice command devices for output of the audio signal as an Ambisonics sound based on the directivity information with respect to the one or more microphones received from the voice command devices. In particular, direction-of-arrival information and/or a detected location of at least one speaker may be taken into account by the SaaS provider when generating the audio channels for the Ambisonics sound field. The audio channels may then be transmitted by SaaS provider as individual audio channels or multi-channel signals including mapping information for mapping each audio channel to a respective active loudspeaker. As a result, the original sound field may be accurately reproduced at the location of the at least one speaker.

In one particular embodiment, one or several active voice command devices can act as higher order loudspeakers (HOLs), i.e. performing a freely adjustable, speaker based, beamforming, which can then be used as the basis to create the desired sound field at the listener's position using e.g. Ambisonics. In this case, the SaaS provider may generate corresponding audio signals for the voice command devices acting as HOLs based on the directivity information with respect to the plurality of voice command devices. Thereby the creation of the sound field can also include adaptively modifying all participating HOLs, insofar as adaptively changing their beams (directivity patterns).

In one further embodiment, at least one voice command device may further comprise a tracking unit, in particular a radar sensor and/or a camera, configured to track a detected speaker. A tracking unit of a single voice command device may be sufficient to provide tracking of the detected speaker. Alternatively, each voice command device may have a tracking unit. Also, a tracking unit separate front the voice command devices may be provided, e.g. as part of a surveillance system, and may be connected to the SaaS provider. In this case, signals from the separate tracking unit are provided to the SaaS provider as a result of the detection of a speaker.

The tracking unit may receive a radar reflection off the detected speaker or capture an image including the detected speaker. The control unit of the voice command device may be used to determine a change in location of a detected speaker with time and to correspondingly adapt the directivity information sent to the SaaS provider by the voice command device. Alternatively, the received signal or captured image may be sent to the SaaS provider to be processed by a control unit of the SaaS provider. A detected change in location of the detected speaker may then be used to correspondingly update the directivity information with respect to the plurality of voice command devices. As a result, beamforming may always be performed with respect to the current location of the speaker/listener.

The present invention further includes a method for operating a plurality of voice command devices of an entertainment system, wherein each voice command device comprises a processor unit, a transceiver, one or more microphones and at least one loudspeaker, and wherein the method comprises: capturing audio signals by the one or more microphones of at least one of the voice command devices, analyzing the captured audio signals by the processor unit of the at least one of the voice command devices to detect a speech signal, transmitting directivity information with respect to the one or more microphones of the at least one of the voice command devices to a software as a service, SaaS, provider via a network using the transceiver of the at least one of the voice command devices upon detection of the speech signal, and receiving directivity information with respect to the plurality of voice command devices from the SaaS provider via the network using the transceiver of the at least one of the voice command devices.

Equivalent modifications and extensions as described above with respect to the system with the plurality of voice command devices, i.e. the entertainment system, may also be applied to the method for operating the plurality of voice command devices. The SaaS provider may in particular be a Cloud service provider and the transceiver of the voice command devices may be configured to exchange data with the SaaS provider via a network, such as the Internet. Each of the one or more microphones captures an audio signal which may be further processed by the voice command device itself and/or the SaaS provider. The captured audio signals may in particular be subjected to speech signal processing as described above in detail.

Detecting a speech signal in the captured audio signals may comprise carrying out speech recognition at the side of the voice command device and/or the SaaS provider. Also, speech activity of at least two different human speakers may be detected using voice recognition. Detecting speech signals of at least two different human speakers may be used to perform beamforming with respect to the at least two different speakers for a plurality of microphones and/or the loudspeakers of the voice command devices. Detecting the speech signal may further comprise subtracting a signal based on an audio signal output by the at least one loudspeaker from the captured audio signals as described above.

The method for operating the plurality of voice command devices may further comprise a calibration step prior to the detection of a speech signal which involves outputting reference signals by the loudspeakers of the voice command devices and capturing them with the microphones of the voice command devices. The calibration step may be performed by the SaaS provider in interaction with the voice command devices. The calibration step may further involve a user inputting information on the spatial distribution of the voice command devices and/or the geometry of the acoustic space, e.g. the room where the voice command devices are located. The calibration data may be input to one or several voice command devices and transmitted by the voice command devices to the SaaS provider.

Detecting a speech signal from the, potentially pre-processed, microphone signal may, in particular, comprise comparing a signal-to-noise ratio of the speech signal with a predetermined threshold and determining that the speech signal is detected if the signal-to-noise ratio is greater than the predetermined threshold as described above.

Detection of a speech signal, e.g. as a positive result of the comparison of a signal-to-noise ratio of a speech signal with a predetermined first threshold, triggers the exchange of directivity information between one or several voice command devices on the one side and the SaaS provider on the other side as described above. The same variants of the directivity information with respect to the plurality of voice command devices and the directivity information with respect to the one or more microphones described above with respect to the entertainment system may also be applied to the method for operating the entertainment system.

The method may therefore in particular further comprise selecting at least one of the plurality of voice command devices as an active voice command device by the SaaS provider based on the transmitted directivity information with respect to the one or more microphones and including corresponding selection information in the directivity information with respect to the plurality of voice command devices as described above. As a consequence, a subgroup of the voice command devices or even a single voice command device may be selected by the SaaS provider for capturing audio signals. Such selected voice command devices are termed active voice command devices. An active voice command device according to the selection information included in the directivity information provided by the SaaS provider may continue to monitor captured audio signals for speech signals from the detected location of the speaker and may also be automatically selected as an audio reproduction device for an audio service provided by the SaaS provider.

Alternatively or additionally, all voice command devices, whether selected as an active device or not, may continue to generally capture audio signals and to analyze them to detect a speech signal from a second or in general other persons, residing for example in a different room or being in the same room but in a different corner of the room. In this case, an active voice command device is characterized by participating in a beamforming process with respect to the detected location of a speaker, via the microphones and/or the loudspeakers. In addition more than one voice command device may be used to create a (surrounding) sound field, whereas, at the same time only a single active voice command device may be sufficient in the same situation.

Still the current position of the person(s) in the room is a valid information, needed e.g. to dynamically modify the steering angle of the beamformer to pick-up voice signals and/or to dynamically change the desired wave field, such that it moves with the moving person. For this type of feature a sort of tracking device included in one or several voice command devices may be used as described above, such that the tracking, especially in terms of a dynamically changing/tracking a sound field may work independently of whether the person talks or not. Such a tracking functionality can be achieved either with a radar sensor included in each voice command device, a camera or by utilizing the installed microphones and speakers (tweeters) in combination with an acoustic echo cancellation signal processing block. Thereby changes of the position of the speaker can be transformed into dynamically changing room-impulse-responses (RIRs) from which either the voice command device itself and/or the SaaS provider can generate the localization information of the person(s). If the location of a detected speaker changes by more than a specific margin based on the tracking functionality, the selection of the active voice command devices may be adapted based on the new position of the speaker. Accordingly, the method may further comprise tracking a detected speaker using a tracking unit, in particular a radar sensor and/or a camera, of at least one voice command device.

The method may also include selecting at least one microphone of the plurality of voice command devices as an active microphone by the SaaS provider based on the transmitted directivity information with respect to the one or more microphones and including corresponding microphone selection information in the directivity information with respect to the plurality of voice command devices as described above. An active microphone continues to monitor captured audio signals for speech signals. In addition, selecting a microphone of a specific voice command device may in particular include selecting the corresponding voice command device as an active voice command device. The ensemble of microphones formed by the selected microphones is used to monitor utterances of at least one located speaker, and optionally audio reproduction may be performed using the at least one loudspeaker of the corresponding voice command devices.

The method may also include determining beamforming information with respect to at least two microphones of the plurality of voice command devices by the SaaS provider based on the transmitted directivity information with respect to the one or more microphones as described above. The method may then further include performing beamforming of the at least two microphones when capturing audio signals as described above wherein the corresponding processing may be partially applied at the side of the active voice command devices based on the directivity information received from the SaaS provider. The remaining beamforming steps may be performed at the side of the SaaS provider.

The directivity information with respect to the plurality of voice command devices may in particular be determined by the SaaS provider based on directivity information with respect to the one or more microphones received from several, in particular all of the voice command devices of the entertainment system.

The method may further comprise calculating a signal-to-noise ratio by the processor unit of the at least one of the voice command devices for the speech signal with respect to each of the microphones and/or with respect to a plurality of different beamforming directions of a plurality of microphones of the corresponding voice command device and including the calculated SNRs in the directivity information with respect to the one or more microphones which is transmitted by the corresponding voice command device to the SaaS provider. The same variants as described above with respect to the entertainment system may be applied in this case. The number and/or distribution of beamforming directions for the calculation of the signal-to-noise ratios may in particular be predetermined, adaptively determined by the voice command device depending on a result of the calculation or determined by the SaaS provider and transmitted to the voice command device. From the transmitted signal-to-noise ratios received from the voice command devices of the entertainment system, the SaaS provider may determine the above described selection information for selecting active voice command devices, the microphone selection information and/or the beamforming information with respect to at least two microphones as described above with respect to the entertainment system.

Alternatively, the method may include estimating direction-of-arrival information for the speech signal by the processor unit of the at least one of the voice command devices based on the captured audio signals and including the estimated DOA information in the directivity information with respect to the one or more microphones as described above using known source localization methods. The SaaS provider may calculate beamforming information with respect to the microphones of the active voice command devices based on the reported DOA information and report this information back to the active voice command devices as part of the directivity information with respect to the plurality of voice command devices.

Alternatively, the method may comprise including the captured audio signals in the directivity information with respect to the one or more microphones and calculating DOA information based on the captured audio signals from at least two voice command devices by the SaaS provider as described above. The calculated DOA information may be returned by the SaaS provider as part of the directivity information with respect to the plurality of voice command devices and the received directivity information may be used by the at least two voice command devices to steer a microphone beam in the direction indicated by the DOA information and/or to perform audio reproduction with an optimum sound field at the location of the sweet spot.

The method may further comprise receiving an audio service comprising at least one audio signal from the SaaS provider and outputting the audio signal through the at least one loudspeaker of at least one voice command device based on the received directivity information with respect to the plurality of voice command devices. The at least one voice command device may in particular be an active voice command device. Again, the same modifications and extensions as described above with respect to the entertainment system may be applied to the present embodiment. The audio signal may be a single-channel or multi-channel audio signal as described above. The transmitted audio signal may in particular comprise dedicated audio signals or audio channels for each active voice command device and/or each loudspeaker of the active voice command devices.

The method may in particular comprise performing beamforming on the received audio signal by the processor unit of the at least one voice command device based on the received directivity information or encoding directivity information with respect to the plurality of voice command devices in the audio signal by the SaaS provider such that the output audio signals form a beam. In particular, only active voice command devices may be used for the audio reproduction. Also, as described above, additional voice command devices may be used for the audio reproduction. The active voice command devices may perform beamforming on the received audio signals themselves or simply output already pre-processed audio signals such that the ensemble of active voice command devices generates a desired sound field at the location of the speaker by forming a beam in the direction of the speaker as described above.

The method may further comprise generating and transmitting a plurality of audio channels associated with different loudspeakers of the at least one voice command device by the SaaS provider to provide stereo sound, surround sound, virtual surround sound or Ambisonics sound at the location of the at least one speaker as described above with respect to the entertainment system. The loudspeakers used to create the desired sound field may in particular belong to different voice command devices. The SaaS provider may for instance provide a left audio channel and a right audio channel to respective loudspeakers of the active voice command devices wherein the audio channels may further be modified using the above described beamforming to generate an optimum sound field at the location of the listener. The SaaS provider may route multiple audio channels to loudspeakers of the active voice command devices wherein the SaaS provider identifies the optimum combination of loudspeakers of the plurality of voice command devices based on the directivity information with respect to the plurality of microphones received from the plurality of voice command devices. After identification of suitable loudspeakers of the active voice command devices, the SaaS provider may transmit a separate audio channel to each of the identified loudspeakers.

The SaaS provider may further encode virtual surround sound information in the plurality of audio channels provided with the audio service to the active voice command devices as described above. Furthermore, the SaaS provider may determine a subset of the loudspeakers of the voice command devices, in particular the active voice command devices, for output of the audio signal as an Ambisonics sound based on the directivity information with respect to the one or more microphones received from the voice command devices. The SaaS provider may then generate the audio channels for the Ambisonics sound field, in particular taking into account direction-of-arrival information and/or a detected location of at least one speaker. The audio channels may then be transmitted by the SaaS provider as individual audio channels or multi-channel signals including mapping information for mapping each audio channel to a respective active loudspeaker.

The present invention further includes a non-transitory computer readable medium having instructions that, when performed by a processor, cause the processor to perform a method according to any of the above-described embodiments. In particular, separate non-transitory computer readable media may be provided for each voice command device and the SaaS provider wherein instructions required for performing the corresponding method steps on the voice command device or the SaaS provider are stored. Alternatively, a dedicated computer readable medium which may be accessed by each of the voice command devices and the SaaS provider may be provided, in particular as part of the services provided by the SaaS provider, wherein the necessary instructions for performing the method steps at the side of the voice command devices are downloaded from the SaaS provider by the voice command devices via the network. The same modifications and extensions as described above with respect to the entertainment system may also be applied to the non-transitory computer readable medium according to the present embodiment.

Instructions or software to control a processor to perform the methods as described above may be written as computer programs, code segments, instructions or any combination thereof, for individually or collectively instructing or configuring the processor to operate as a machine or special-purpose computer to perform the operations of the methods as described above. In one example, the instructions or software may include machine code that is directly executed by the processor, such as machine code produced by a compiler. In another example, the instructions or software may include higher level code that is executed by the processor using an interpreter. Programmers of ordinary skill in the art can readily write the instructions or software based on the description of the methods provided herein.

The described inventive method and system allow for an automatic selection of the best suited voice command devices in terms of capturing a speech signal as well as audio reproduction with respect to the speaker. As the SaaS provider collects all necessary information for this selection from the individual voice command devices, an efficient and optimized selection process can be performed, in particular using the extended computing resources generally provided by SaaS providers. As most of the processing is handled by the SaaS provider, the voice command devices may be simplified in terms of computational power such that the dissemination of the inventive entertainment system may be promoted.

Combining the information with respect to the location of a speaker collected from several voice command devices, allows for highly accurate and real-time beamforming of the microphones of several voice command devices in the direction of the location of the speaker and at the same time allows providing high quality audio reproduction by multiple voice command devices. Here, the necessary audio signals for beamforming the output audio signals and/or the necessary audio channels for higher order sound fields may be generated at the side of the SaaS provider taking into account the relative spatial location of the voice command devices and the location of the speaker.

Further features and exemplary embodiments as well as advantages of the present invention will be explained in detail with respect to the drawings. It is understood that the present invention should not be construed as being limited by the description of the following embodiments. It should furthermore be understood that some or all of the features described in the following may also be combined in alternative ways.

Figure 1:
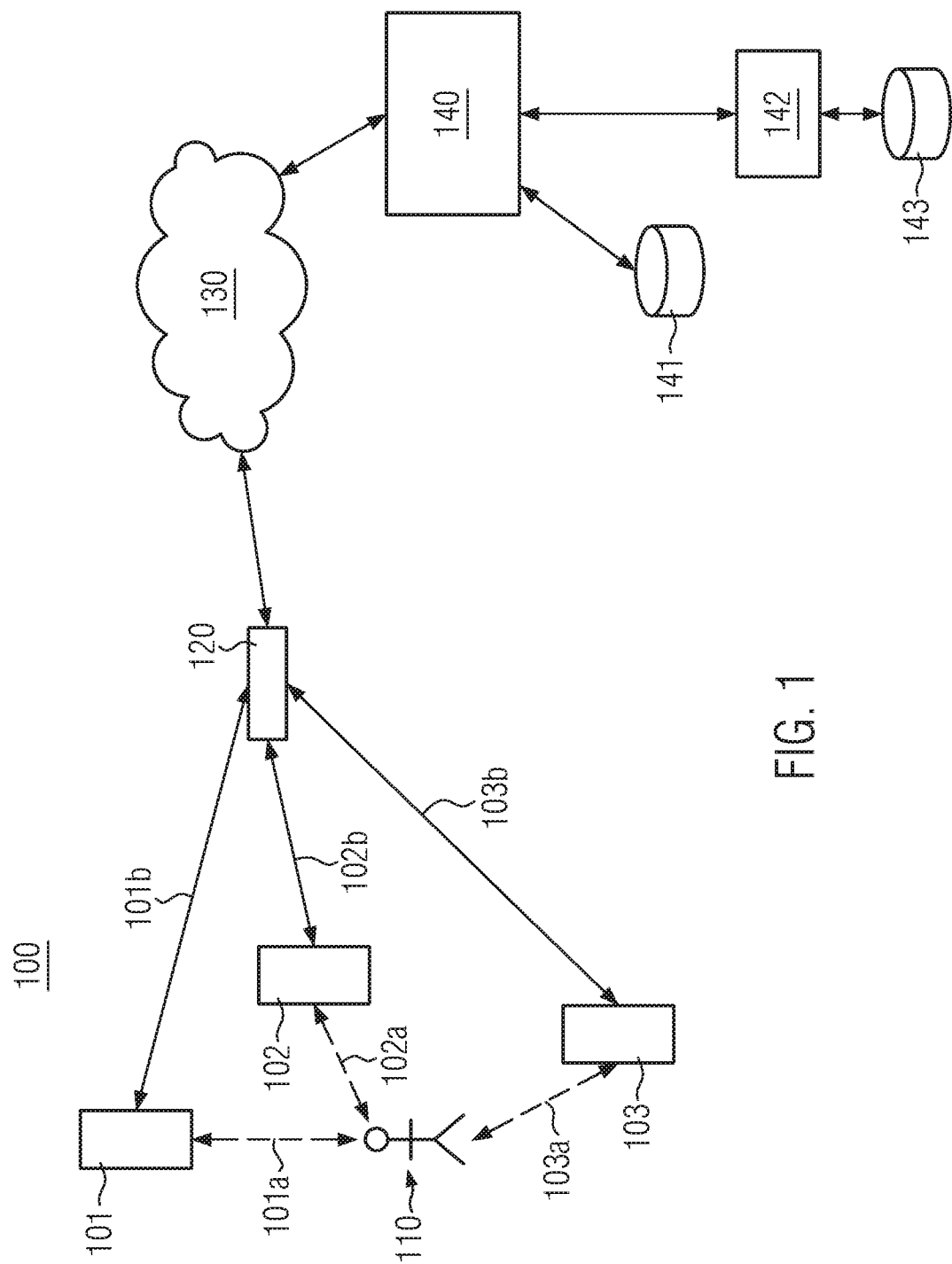
FIG. 1 shows an exemplary entertainment system according to the present invention in interaction with a Cloud service provider.

FIG. 1 shows an exemplary entertainment system according to the present invention in interaction with a Cloud service provider or SaaS provider. The schematic representation shows an illustrative example of an entertainment system 100 comprising three voice command devices 101 to 103. The voice command devices 101 to 103 are arranged in different spatial locations of an acoustic space (not shown) such as the sequence of rooms shown in FIG. 6. The number of voice command devices and their spatial relationship to a user 110 who is also present inside the acoustic space is selected for illustration purposes only and does not limit the scope of the present disclosure. Also, more than one user may be present inside the acoustic space.

The user 110 shown in FIG. 1 represents a human speaker and listener. The acoustic paths between the user 110 and the voice command devices 101 to 103, more particularly the microphones and loudspeakers of the voice command devices, along which sound waves representing a speech signal as uttered by the user 110 or an audio signal as output by the loudspeakers of the voice command devices travel, are indicated by dashed lines 101*a* to 103*a*. The dashed lines therefore also represent direction-of-arrival information as it can be detected by the individual voice command devices based on a speech signal emitted by the user 110. As described above in detail, each of the voice command devices 101 to 103 is configured to capture audio signals inside the acoustic space using one or more microphones and to provide audio reproduction capabilities for reproduction of an audio service provided by an SaaS provider.

To this end, each of the voice command devices 101 to 103 is connected to a remote device 120 which may be a gateway, a home agent, a router installed in a home network, or any other device for connecting a local area network such as a home network to the Internet 130, as indicated by the solid lines 101*b* to 103*b*. The connection between the voice command devices and the remote device 120 may be wireless, e.g. using corresponding wireless transceivers such as WiFi or Bluetooth, or may be via cable, such as Ethernet, USB connections, HDMI connections or any other wired connection known in the art. Both, the voice command devices 101 to 103 and the remote device 120 may include corresponding network capabilities, i.e. transceivers, encoders/decoders, encryption units or any other network units known in the art. As an alternative to using a remote device 120 as a gateway, each of the voice command devices 101 to 103 may also be equipped with a transceiver for direct connection to the Internet 130, e.g. with a transceiver for direct connection to a mobile communication network.

The voice command devices 101 to 103 exchange data and control signals with an SaaS provider or Cloud service device 140 via the remote device 120 or directly by means of the Internet 130. The schematic representation in FIG. 1 shows a single SaaS provider 140 being connected to the Internet 130 according to any connectivity models known in the art, in particular as they are used for The Cloud. However, the present invention is not limited to such a configuration, but an arbitrary number of SaaS providers may be connected to the Internet 130 and configured to exchange data and control signals with the home entertainment system 100. Also, the voice command devices 101 to 103 may be provided in an automotive environment, such as the cabin of a vehicle, instead of a user's home.

The SaaS provider 140 may be configured to provide audio services such as playback of music, audiobooks, telephone connections, audio tracks of videos, digital broadcast of audio contents, or any other audio service to the home entertainment system 100. The audio services may in particular include payable audio services wherein authentication of the home entertainment system 100 with the SaaS provider may be negotiated according to any of the protocols known in the art. In addition, the data exchange between the home entertainment system 100 and the SaaS provider 140 may be encrypted for security and privacy. Encryption may be performed by the voice command devices and/or the remote device 120.

According to the illustrative example shown in FIG. 1, the Internet 130 may be connected to a primary service provider 140 which, in turn, is coupled to one or more secondary service providers 141, 142 and 143. Among the secondary service providers, some service providers 141 and 143 may mainly serve as databases, in particular for audio content while other service providers 140 and 142 may provide computing resources for processing data received from the Internet 130. According to the present invention, the SaaS provider 140 may in particular process directivity information and/or captured audio signals received from the plurality of voice command devices of the entertainment system 100 to determine directivity information with respect to the plurality of voice command devices as described above and/or to provide audio services which feature an optimized sound field at the location of the at least one speaker 110. In addition, the Cloud service providers 140 and 142 may also provide databases, in particular with respect to the audio services offered by these providers. The structure and functionality of Cloud service providers, i.e. SaaS providers, is well known in the art such that a detailed description is omitted here for clarity.

According to the present invention, the SaaS provider interacts with the entertainment system 100, more particularly with a plurality of voice command devices 101 to 103, to optimize capture of a speech signal emitted by a user 110, in particular by collective beam steering of the microphones of the voice command devices 101 to 103 in the direction of the speaker 110. The SaaS provider locates the speaker 110 in cooperation with the voice command devices based on speech uttered by the user 110. Based on the detected location of the speaker, the SaaS provider 140 may further generate or modify audio signals transmitted to the entertainment system 100 as part of a requested audio service such that the audio signals emitted by the loudspeakers of multiple voice command devices create a high-quality sound field at the location of the listener 110.

As is known in the art, each voice command device 101 to 103 may be configured to be activated by a keyword or key phrase spoken by the user 110, such as "Alexa". The voice command devices may thus constantly monitor the acoustic space for speech signals. As a result of a detected keyword or key phrase, each voice command device may analyze the detected speech signal or transmit the speech signal to the SaaS provider 140 for analysis. In an alternative configuration, the voice command devices 101 to 103 may be configured to transmit any detected speech signal directly to the SaaS provider 140 without analyzing the speech signal. Analysis of the speech signal, as triggered by a keyword or key phrase, may yield a request for an audio service such as "Alexa, play music". Further details necessary for fulfilling the requested audio service may be provided through additional speech, in particular in response to corresponding questions transmitted by the SaaS provider 140 to the entertainment system 100.

Figure 2:
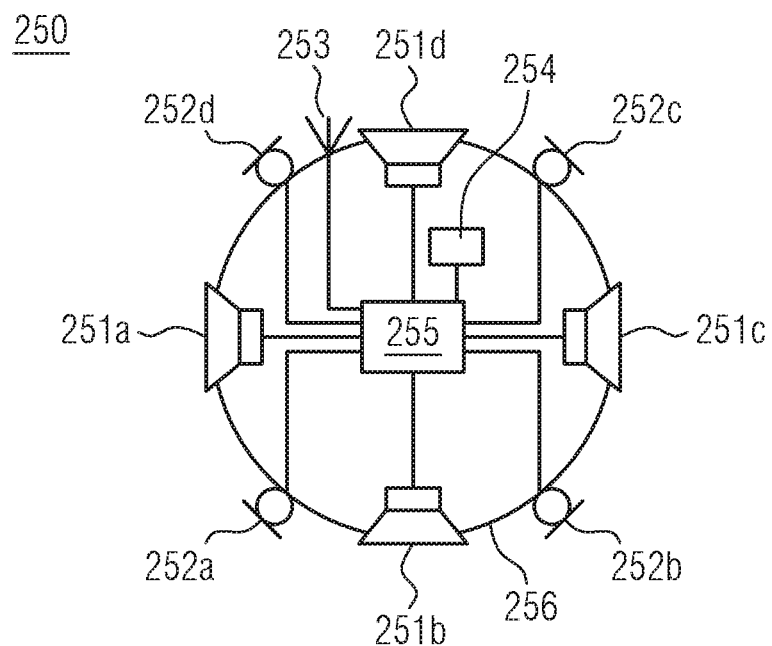
FIG. 2 shows a schematic representation of a voice command device according to the present invention.

An exemplary embodiment of a voice command device 250 is shown in FIG. 2. According to the non-limiting example shown in FIG. 2, the voice command device 250 may have a circular cross-section, for instance by having a cylindrical outer wall 256. Along the circumference of the wall 256, a plurality of microphones 252*a-d* are arranged to capture audio signals present in the acoustic space which the voice command device 250 is located in. Also, a plurality of loudspeakers 251*a-d* is arranged along the circumference of the wall 256. In the example of FIG. 2, microphones and loudspeakers are arranged alternately along the circumference. The present invention is, however, not limited to any particular arrangement of the microphones and loudspeakers as long as each voice command device has a plurality of microphones and at least one loudspeaker.

Figure 3:
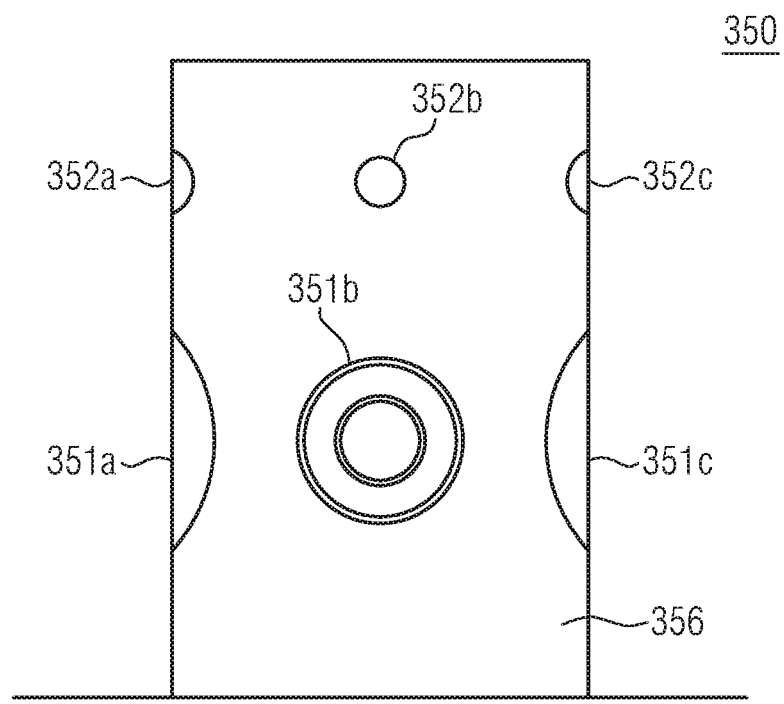
FIG. 3 shows a voice command device according to the present invention having a cylindrical shape.

By way of example, loudspeakers 351*a-c* may be arranged below microphones 352*a-c* around the circumference of a cylindrical wall 356 of a voice command device 350 as shown in a side view in FIG. 3. Also, the number of microphones and loudspeakers may vary and may in particular, be different. A large number of alternative arrangements of microphones and loudspeakers for voice command devices are included in the present disclosure. The voice command devices 250 and 350 are provided as 360° devices with respect to microphones and loudspeakers. This means, that the azimuthal range of the microphones and loudspeakers, respectively, covers the full circle. Other arrangements, i.e. covering only segments of a circle, may also be employed, in particular if the corresponding voice command devices shall be placed against a wall or in a corner of a room. Ideally, the arrangement of the plurality of voice command devices inside the acoustic space is such that any possible location of a speaker/listener may be reached by acoustic waves from at least two of the voice command devices. The present disclosure is, however, not limited to this situation.

As schematically shown in FIG. 2, each of the microphones 252a-d and each of the loudspeakers 251a-d is connected to a processor unit 255. As described above in detail, this processor unit may be a CPU or a GPU and/or may comprise a dedicated digital signal processor. Alternatively, as shown in FIG. 2, a DSP 254 for processing captured audio signals as well as received audio signals being part of an audio service provided by the SaaS provider may be separately provided. A large number of additional units known for voice command devices such as Amazon's Echo may be part of the voice command devices of the present invention. Among these, additional processor units, volatile and non-volatile memory units, storage units, FFT/IFFT units, matrixing units, amplifiers, A/D and D/A converters and the like may be mentioned.

The exemplary embodiment in FIG. 2 further shows a wireless transceiver 253 for communication with the remote device 120 and/or a mobile communication network. As transceivers, both wireless and wired, are well known in the art, a detailed description is omitted here. As described above, the microphones 252a-d may be omnidirectional or directional microphones, and the loudspeakers 251a-d may be any of the known loudspeakers such as broadband, midrange, tweeters, woofers, subwoofers and the like. The array of loudspeakers 251a-d may further comprise subgroups of loudspeakers of a particular type, which may themselves be arranged along the circumference of the device housing 256.

Figure 4:
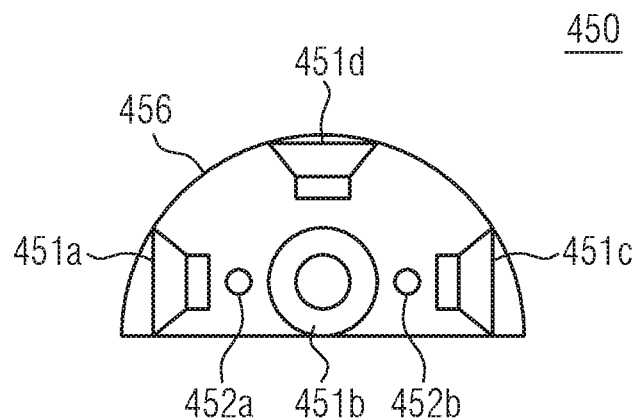
FIG. 4 shows a voice command device according to the present invention in the form of a hemisphere.

A further variant of the form factor of a voice command device 450 is shown in FIG. 4 in a side view. In this embodiment, an array of loudspeakers 451a-d is mounted in or on the surface of a rigid hemisphere 456 of a voice command device 450. The loudspeakers may be regularly or quasi-regularly distributed over the surface of the hemisphere 456. The hemisphere 456 has a dome-shaped surface and another part has a plane surface. The array of loudspeakers are mounted in or on the dome-shaped surface wherein the loudspeakers 451a-c may be arranged close to the plane surface and the loudspeaker 451d may be arranged most distant to the plane surface, for example, at a pole of the hemisphere 456. The voice command device 450 may rest on a floor of a room or be mounted to a wall or the ceiling of a room or a vehicle cabin with its plane surface. In addition to the loudspeakers 451a-d, the voice command device 450 according to the embodiment depicted in FIG. 4 has a plurality of microphones 452a-b which may be arranged near the plane surface along the circular cross-section of the hemisphere.

While the arrangement of the microphones covers a 360° azimuthal range for capturing speech signals, the three-dimensional arrangement of the loudspeakers 451a-d allows for audio reproduction of a three-dimensional sound field, e.g. using Ambisonics audio channels. As described above in detail, the SaaS provider may transmit dedicated audio channels to each of the loudspeakers 451a-d of the voice command devices as part of an audio service such that a desired Ambisonics sound field may be generated at the location of the speaker 110.

Figure 5:
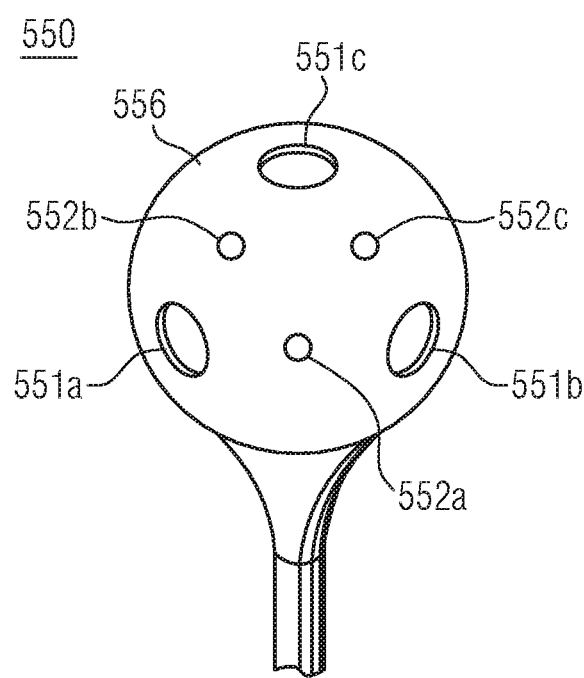
FIG. 5 shows a spherical voice command device according to the present invention.

Another exemplary embodiment of a voice command device 550 according to the present invention is shown in FIG. 5. According to this embodiment, a three-dimensional microphone array 552a-c is arranged over a sphere 556 wherein the microphones may be regularly distributed over the surface of the sphere 556. Offset to the microphones 552a-c, a plurality of loudspeakers 551a-c is mounted on or in the surface of the sphere 556. The arrangement of the loudspeakers may be regular with the exception that no loudspeaker is provided at the location of a mounting element. The spherical voice command device 550 nearly covers the full range, i.e. $4\pi$, of the three-dimensional acoustic space. Using multiple spherical voice command devices 550, higher order wave fields, such as Ambisonics sound fields, may be created at the location of the listener.

It is understood that the plurality of voice command devices may also comprise a mixture and/or groups of voice command devices according to embodiments exemplarily shown in FIGS. 2 to 5. In general, the relative spatial arrangement of the microphones and loudspeakers of each voice command device is fixed and well-defined. Corresponding information may be known to the processor unit of the voice command device, in particular stored in a memory unit of the voice command device, and may be transmitted to an SaaS provider together with the above described directivity information with respect to the one or more microphones or in a separate setup or initialization procedure. As part of such a setup or initialization procedure, also the relative spatial arrangement of the plurality of voice command devices inside the acoustic space may be input by a user or determined using reference signals as described above and transmitted to the SaaS provider. The information on the relative spatial arrangement of microphones and loudspeakers as well as the relative spatial arrangement of the voice command devices may be used by the voice command devices and/or the SaaS provider to perform transformations on received microphone signals or audio signals to be output to perform beamforming as described above.

Figure 6:
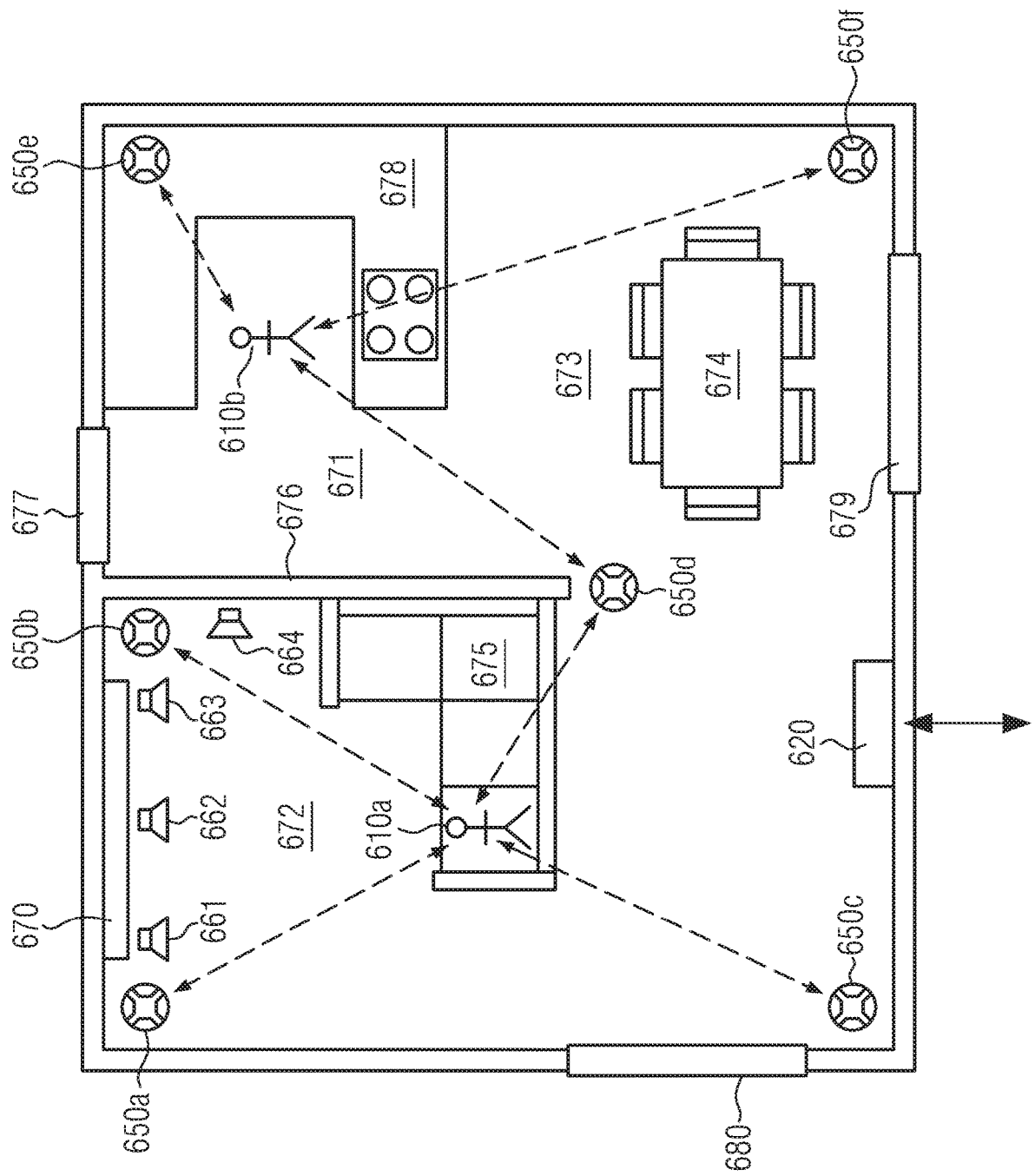
FIG. 6 shows a schematic representation of an exemplary installation of an entertainment system according to the present invention in a home of a user.

FIG. 6 shows a schematic representation of an exemplary installation of an entertainment system in a home of a user according to the present invention. It is understood that the number and relative arrangement of the voice command devices shown in FIG. 6 are selected for illustration purposes only. A simplified representation of a user's home is shown in FIG. 6, having a door 677 leading to a kitchen area 671 which is separated from a living room area 672 by a wall 676. A counter 678 of the kitchen is schematically shown in the kitchen area 671. The sequence of rooms shown in FIG. 6 further includes a dining area 673, wherein a table 674 including six chairs is schematically shown. Furthermore, a TV set 670 and a couch 675 are provided in the living room area 672. Finally, windows 679 and 680 are shown in the wall of the user's home.

A total of six voice command devices 650a-f are distributed over the sequence of rooms in the illustrated example. Each of the voice command devices may be provided according to one of the above described form factors, depending on mounting requirements as well as style considerations. By way of example, the voice command devices 650*a-c* and 650*f* may be provided as cylinders on the floor of the rooms while voice command device 650*e* may be provided as a hemisphere on the kitchen counter and voice command device 650*d* may be provided as a spherical voice command device hanging from the ceiling of the room. The exemplary arrangement of the voice command devices 650*a-f* according to FIG. 6 is such that any point inside the sequence of rooms is accessible to sound waves emitted at least from two of the voice command devices.

Two exemplary locations of users are shown in the figure to demonstrate the present invention. While user 610*a* is seated on the couch 675, possibly watching a video on the TV set 670, user 610*b* is standing in the kitchen area 671. As a consequence, speech signals uttered by the user 610*a* can easily be captured by voice command devices 650*a-d* while voice command device 650*f* may be too remote from the speaker 610*a* and/or shielded by the table 674 to capture speech from the user 610*a* with a sufficiently high signal-to-noise ratio. Voice command device 650*e* is separated from speaker 610*a* by the wall 676 such that sound waves cannot travel between voice command device 650*e* and the user 610*a*. Likewise, speech signals emitted by user 610*b* cannot be reliably detected by voice command device 650*c* which may be too remote, nor by voice command devices 650*a* and 650*b* which are separated from user 610*b* by wall 676. As a consequence, only voice command devices 650*d-f* may capture speech signals from user 610*b* with a sufficient signal-to-noise ratio.

Similar considerations apply for the reproduction of an audio service through the voice command devices. In particular, voice command devices 650*a-d* may be used for audio reproduction at the location of listener 610*a* while voice command devices 650*d-f* may be used for audio reproduction at the location of listener 610*b*. As a result of the above described directed emission of audio signals via beam steering and/or using surround sound or Ambisonics effects, nearly completely separated sound fields may be created at the locations of users 610*a* and 610*b*. In fact, a single voice command device 650*d* may be used to simultaneously contribute to the sound fields at the locations of users 610*a* and 610*b* through usage of dedicated loudspeakers and/or audio channels during audio reproduction. As described above, the SaaS provider may use directivity information with respect to the microphones of multiple voice command devices to locate speakers 610*a* and 610*b* and to generate dedicated audio signals and/or audio channels for each voice command device which is in a suitable position for audio reproduction and/or each loudspeaker of such voice command devices which may be used to create a desired sound field at the location of the respective listener.

Without limitation, further loudspeakers 661 to 664 may be provided inside the acoustic space separately from the voice command devices, which may be additionally used during audio reproduction by the voice command devices. To this end, the loudspeakers 661 to 664 may be connected to at least one of the voice command devices, either wirelessly or via cable, and their relative location may be determined by way of measurement and/or detection and may be stored in a memory of the voice command device or determined using the above described calibration procedure by means of the microphones of the plurality of voice command devices. By way of example, a test signal may be output by individual loudspeakers and captured by the microphones of the voice command devices to determine the position of the corresponding loudspeaker. The non-limiting example shown in FIG. 6 shows a left-channel loudspeaker 661, a right-channel loudspeaker 663, a central loudspeaker 662 and a subwoofer 664 as part of the audio system installed in the user's home.

Through beam steering of the microphones of the corresponding voice command devices, uttered commands can be reliably detected and captured from separated users 610*a* and 610*b*. Furthermore, fully separated sound fields including high order sound effects may be created at the sweet spots of listeners 610*a* and 610*b*. Finally, FIG. 6 shows a remote device 620, such as a wireless router, which communicates with each of the voice command devices 650*a-f* and the Internet.

Figure 7:
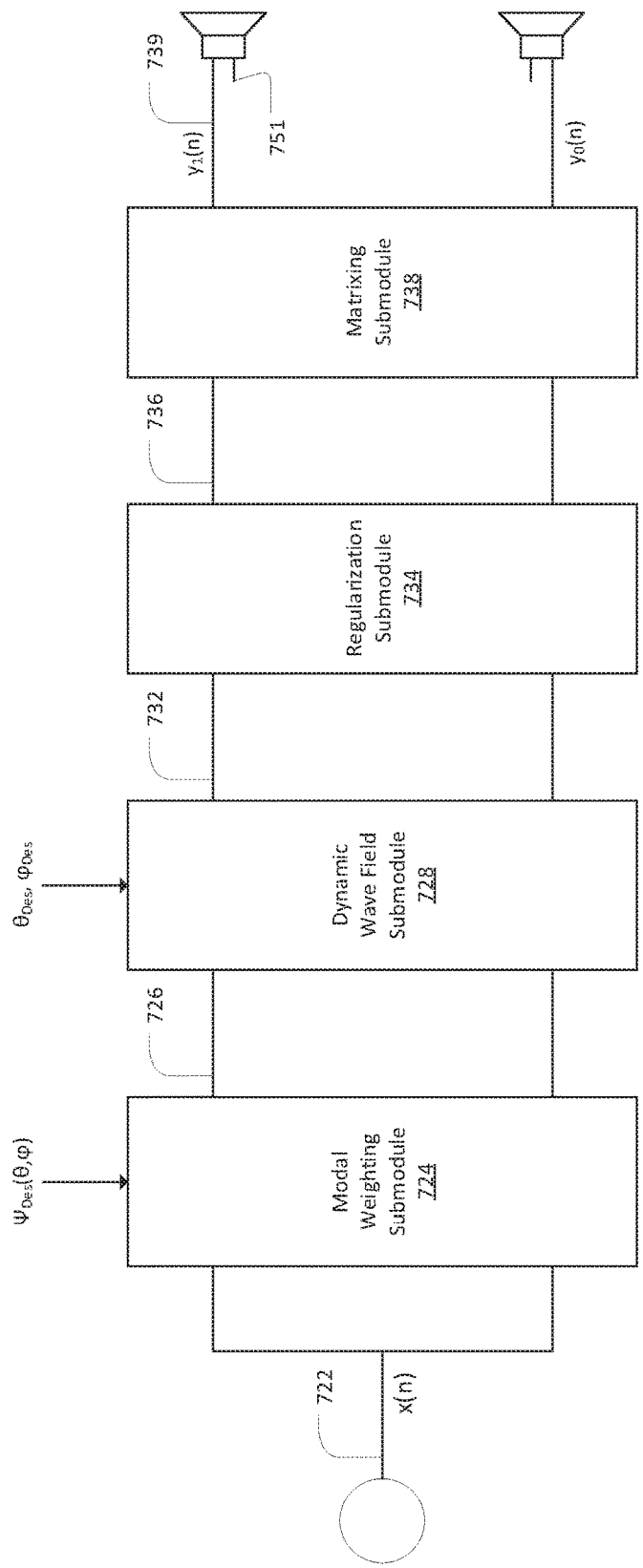
FIG. 7 shows a schematic representation of an exemplary beamformer for audio reproduction according to the art.

FIG. 7 shows a schematic representation of an exemplary beamformer for audio reproduction according to the art. The depicted beamformer or any other known beamformer may be used with an array of the loudspeakers of the voice command devices according to the present invention. The beamformer module as depicted in FIG. 7 controls a loudspeaker assembly with Q loudspeakers 751 or Q groups of loudspeakers, each with a multiplicity of loudspeakers such as tweeters, mid-frequency range loudspeakers and/or woofers, depending on N input signals 722. The beamforming module may further include a modal weighting submodule 724, a dynamic wave field manipulation submodule 728, a regularization submodule 734 and a matrixing submodule 738. The modal weighting submodule 724 is supplied with the input signals 722 [x(n)], which are weighted with filter coefficients to provide a desired beam pattern, i.e. radiation pattern $\Psi_{Des}(\theta, \varphi)$ based on N spherical harmonics $Y_{n,m}{}^\sigma(\theta, \varphi)$, to deliver N weighted Ambisonics signals 726. The weighted Ambisonics signals 726 are transformed by the dynamic wave field manipulation submodule 728 using weighting coefficients to rotate the desired beam pattern $\Psi_{Des}(\theta, \varphi)$ to a desired position $\theta_{Des}$, $\varphi_{Des}$. Thus, N modified, e.g. rotated, focused and/or zoomed, and weighted ambisonics signals 732 are output by the dynamic wave field manipulation submodule 728.

The N modified and weighted Ambisonics signals 732 are then input into the regularization submodule 734 which performs additional filtering on the signals, in particular with respect to white noise. The resulting signals 736 of the regularization submodule 734 are then transformed by the matrixing submodule 738 using an N×Q weighting matrix into Q loudspeaker signals 739 [$y_1(n), \ldots, y_Q(n)$]. Alternatively, the Q loudspeaker signals 739 may be generated from the N regularized, modified and weighted Ambisonics signals 736 by a multiple-input multiple-output submodule using an N×Q filter matrix. The beamforming module shown in FIG. 7 may be used with any of the voice command devices to create a two-dimensional or three-dimensional sound field at the location of the listener using higher-order Ambisonics.

Figure 8:
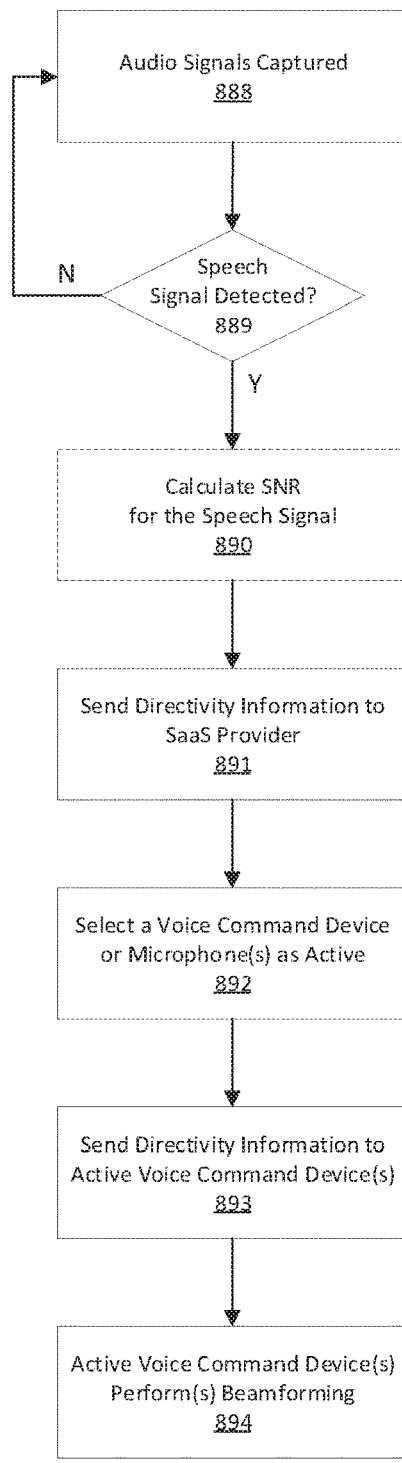
FIG. 8 shows an exemplary process flow for a method of operating an entertainment system according to the present invention.

FIG. 8 shows an exemplary process flow for a method of operating an entertainment system according to the present invention. In step 888, audio signals are captured by the one or more microphones of one or several voice command devices. The captured audio signals are analyzed by the processor unit of the corresponding voice command devices in step 889 to detect a speech signal. If no speech signal can be detected from the captured microphone signals, the process flow returns to step 888. If a speech signal is detected in the captured microphone signals, a signal-to-noise ratio may be calculated for the speech signal with respect to each of the microphones and/or with respect to a plurality of different beamforming directions of the plurality of microphones of the corresponding voice command device in step 890 as described above. Alternatively, direction-ofarrival information may be estimated for the speech signal by the processor unit of the respective voice command device based on the captured audio signals in step 890.

The resulting signal-to-noise ratios or DOA information may be included in the directivity information with respect to the one or more microphones sent by one or more voice command devices to the SaaS provider in step 891. From the received directivity information with respect to the one or more microphones, the SaaS provider may select at least one of the plurality of voice command devices as an active voice command device in step 892. Alternatively or additionally, the SaaS provider may select at least one microphone of the plurality of voice command devices as an active microphone in step 892. Furthermore, additionally or alternatively, beamforming information with respect to at least two microphones of the plurality of voice command devices may be determined by the SaaS provider in step 892. The corresponding selection information, microphone selection information and/or beaming information may be included in the directivity information with respect to the plurality of voice command devices which is sent by the SaaS provider to at least the active voice command devices in step 893. As a consequence, at least one voice command device receives directivity information with respect to the plurality of voice command devices from the SaaS provider via the network in step 893.

Based on the received directivity information, the active voice command devices perform beamforming on the selected microphones in step 894 to monitor speech signals from a user with enhanced signal-to-noise ratio. In addition to this monitoring, voice command devices and/or microphones which may not have been selected as active may continue receiving audio signals from the acoustic space and analyzing the audio signals for a speech signal. Alternatively, the entire process may be reinitiated at step 888 if the signal-to-noise ratio of the beamformed microphone signal drops below a lower threshold and/or if a predetermined time period expires and/or if tracking of the speaker by radar means or a camera indicates that the speaker has moved out of the sweet zone.

Figure 9:
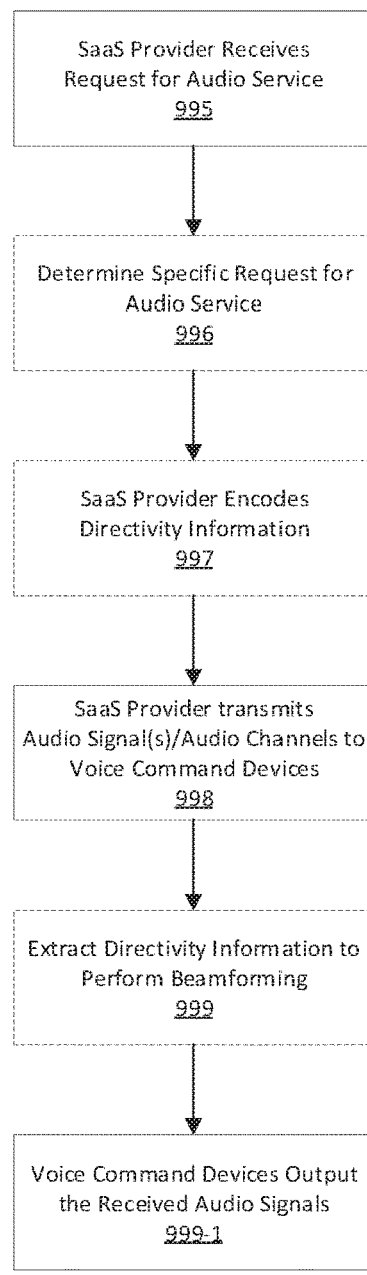
FIG. 9 shows an exemplary process flow for audio reproduction using an entertainment system according to the present invention.

FIG. 9 shows an exemplary process flow for audio reproduction using an entertainment system according to the present invention. According to the present invention, it is assumed that the process according to FIG. 8 has already been executed when a request for an audio service is received from the entertainment system at the SaaS provider in step 995. As described above, such a request may be analyzed at the side of the entertainment system or at the side of the SaaS provider. According to the embodiment of FIG. 9, the speech signal comprising the request is transmitted front the entertainment system to the SaaS provider and analyzed in step 996 to detect and determine a specific request for an audio service. Alternatively, the analysis may be performed at the side of the entertainment system and the results may be transmitted as digital information to the SaaS provider. In response to the reception of a request for an audio service, the SaaS provider may provide an audio signal, for instance based on audio data stored in a database or a storage device, which may be further processed before transmitting the audio signal to the entertainment system.

In one embodiment, the directivity information with respect to the plurality of voice command devices may be encoded in the audio signal at the side of the SaaS provider in step 997 such that the audio signals when output by the loudspeakers of the voice command devices of the entertainment system form a beam in the direction of the located user. Alternatively or additionally, a plurality of audio channels associated with different loudspeakers of at least one voice command device may be generated in step 997 based on audio data retrieved by the SaaS provider to provide stereo sound, surround sound, virtual surround sound or Ambisonics sound at the sweet spot. The resulting audio signals or audio channels may be transmitted as part of, in combination with or subsequent to directivity information with respect to the plurality of voice command devices from the SaaS provider to respective voice command devices of the entertainment system in step 998.

From the received directivity information, the voice command devices may extract the necessary information for performing beamforming on the received audio signals by the processor unit of at least one voice command device in step 999. However, as the beamforming information, such as phase shifts and/or weights, may already be encoded in the audio signals received from the SaaS provider, step 999 may be omitted to preserve computing resources at the side of the entertainment system. In step 999-1 finally, the received audio signals, in particular dedicated audio channels, are output by the corresponding voice command devices through the respective loudspeakers based on the received directivity information with respect to the plurality of voice command devices. In particular, dedicated audio channels received by the active voice command devices may be mapped to corresponding loudspeakers using mapping information included in the received directivity information such that a sound field of a desired quality is created at the location of one or more listeners. The present invention according to the process flow in FIG. 9 in particular allows for audio reproduction of fully separated Ambisonics sound fields at two or more sweet spots in the acoustic space.

Figure 10:
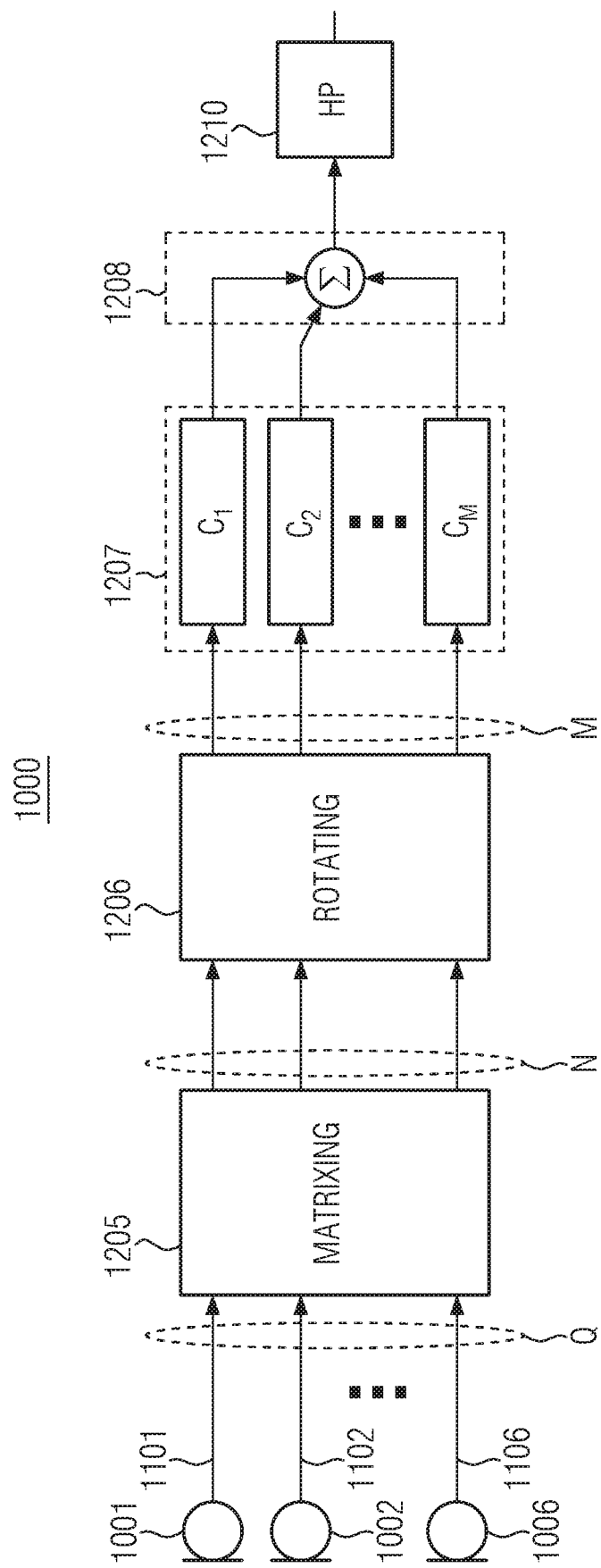
FIG. 10 shows a schematic representation of an exemplary beamformer for microphone beamforming according to the art.

FIG. 10 finally shows a schematic representation of an exemplary beamformer 1000 for microphone beamforming according to the art. Without limitation, the beamformer 1000 comprises microphones 1001 to 1006 which output captured audio signals 1101 to 1106. As described above, the microphones 1001 to 1006 may be provided as part of a single voice command device or distributed over multiple voice command devices. Also, as further described above, the microphone signals of the microphones of a voice command device may be beamformed by the voice command device itself or the SaaS provider while the microphone signals from multiple voice command devices are beamformed by SaaS provider. As a result, the below described components of the beamformer 1000 may be provided as part of the voice command devices and/or the SaaS provider.

According to the exemplary embodiment depicted in FIG. 10, a total of Q microphone signals 1101 to 1106 are fed into a matrixing module 1205 which supplies N spherical harmonics to a rotational module 1206. The rotational module 1206 generates M rotated spherical harmonics from the N spherical harmonics which are weighted, i.e. multiplied with frequency dependent weighting coefficients $C_1$ to $C_M$ in a modal weighting module 1207 and then summed up in a summing module 1208 to form a beamformed microphone signal, i.e. a directional signal of the plurality of microphones 1001 to 1006. The resulting signal may optionally be passed through a high-pass filter 1210 for noise reduction.

The described beamformer may be implemented in the voice command devices and/or the SaaS provider. By implementing the beamformer 1000 in the SaaS provider, the voice command devices may be simplified.

While the preceding is directed to embodiments of the present disclosure, other and further embodiments of the disclosure may be devised without departing from the basic scope thereof, and the scope thereof is determined by the claims that follow.

What is claimed is:

1. A system with a plurality of voice command devices, each of the voice command devices comprising:
a processor unit,
a transceiver coupled to the processor unit and configured to couple to a network,
one or more microphones, each configured to capture an audio signal, and
at least one loudspeaker,
wherein the processor unit of each voice command device in the plurality of voice command devices is configured to:
detect a speech signal in the captured audio signals,
upon detection of the detected speech signal, transmit to a software-as-a-service (SaaS) provider via the network using the transceiver, first directivity information of at least one source of the detected speech signal with respect to one or more microphones of the respective voice command device, and
receive, from the SaaS provider via the network using the transceiver, second directivity information of the at least one source of the detected speech signal with respect to the plurality of voice command devices.

2. The system of claim 1, wherein the second directivity information comprises at least one of:
selection information for selecting at least one voice command device of the plurality of voice command devices as an active voice command device,
microphone selection information for selecting at least one microphone, or
beamforming information with respect to at least two microphones.

3. The system of claim 1, wherein the first directivity information comprises a signal-to-noise ratio (SNR) calculated by the processor unit for the speech signal with respect to (i) each microphone of the one or more microphones, or (ii) a plurality of different beamforming directions of a plurality of microphones of the at least one voice command device.

4. The system of claim 1, wherein the first directivity information comprises direction-of-arrival (DOA) information that is estimated by the processor unit based on the captured audio signals.

5. The system of claim 1, wherein:
the first directivity information comprises the captured audio signals, and
the second directivity information comprises direction-of-arrival (DOA) information calculated by the SaaS provider based on the captured audio signals from at least two voice command devices in the plurality of voice command devices.

6. The system of claim 1, wherein each voice command device in the plurality of voice command devices is further configured to:
receive, from the SaaS provider, an audio service comprising at least one service audio signal; and
output, based on the second directivity information, the at least one service audio signal through the at least one loudspeaker.

7. The system of claim 6, wherein outputting the at least one service audio signal comprises beamforming the at least one service audio signal based on the second directivity information.

8. The system of claim 6, wherein the audio service comprises a plurality of audio channels associated with different loudspeakers of the plurality of voice command devices providing at least one of stereo sound, surround sound, virtual surround sound, or Ambisonics sound.

9. The system of claim 1, wherein at least one voice command device included in the plurality of voice command devices further comprises a tracking unit configured to track a detected speaker.

10. A method for operating a plurality of voice command devices, wherein each voice command device in the plurality of voice command devices comprises a processor unit, a transceiver, one or more microphones and at least one loudspeaker, the method comprising:
capturing, by the one or more microphones of at least one voice command device in the plurality of voice command devices, audio signals;
analyzing, by the processor unit of the at least one voice command device in the plurality of voice command devices, the captured audio signals to detect a speech signal;
transmitting, to a software-as-a-service (SaaS) provider via a network using the transceiver of the at least one voice command device in the plurality of voice command devices, first directivity information of at least one source of the detected speech signal, with respect to one or more microphones of the at least one voice command device in the plurality of voice command devices; and
receiving, from the SaaS provider via the network using the transceiver of the at least one voice command device in the plurality of voice command devices, second directivity information of the at least one source of the detected speech signal with respect to the plurality of voice command devices.

11. The method of claim 10, further comprising at least one of:
(i) selecting, by the SaaS provider and based on the first directivity information, at least one voice command device of the plurality of voice command devices as an active voice command device, and including corresponding selection information in the second directivity information;
(ii) selecting, by the SaaS provider and based on the first directivity information, at least one microphone in the plurality of voice command devices as an active microphone, and including corresponding microphone selection information in the second directivity information; or
(iii) determining, by the SaaS provider and based on the first directivity information, beamforming information with respect to at least two microphones in the plurality of voice command devices, and including corresponding beamforming information in the second directivity information.

12. The method of claim 10, further comprising at least one of:
(i) calculating, by the processor unit of the at least one voice command device in the plurality of voice command devices, a signal-to-noise ratio (SNR) for the speech signal with respect to each microphone of the one or more microphones, or with respect to a plurality of different beamforming directions of a plurality of microphones of the at least one voice command device, and including the calculated SNRs in the first directivity information; or (ii) estimating, by the processor unit of the at least one voice command device in the plurality of voice command devices and based on the captured audio signals, direction-of-arrival (DOA) information for the speech signal, and including the estimated DOA information in the first directivity information; or (iii) including the captured audio signals in the first directivity information, and calculating, by the SaaS provider and based on the captured audio signals from at least two voice command devices, DOA information for the speech signal.

13. The method of claim 10, further comprising:

receiving, from the SaaS provider, an audio service comprising at least one service audio signal; and outputting, based on the received second directivity information, the at least one service audio signal through the at least one loudspeaker of the at least one voice command device.

14. The method of claim 13, further comprising:

performing, by the processor unit of the at least one voice command device and based on the received second directivity information, beamforming on the at least one service audio signal; or encoding, by the SaaS provider, the second directivity information in the at least one service audio signal such that the at least one service audio signal forms a beam.

15. The method of claim 13, further comprising generating and transmitting, by the SaaS provider, a plurality of audio channels associated with different loudspeakers in the plurality of voice command devices to provide at least one of stereo sound, surround sound, virtual surround sound, or Ambisonics sound.

16. The method of claim 10, further comprising tracking a detected speaker using a tracking unit associated with the at least one voice command device.

17. One or more non-transitory computer-readable media including instructions that, when executed by one or more processors, cause the one or more processors to perform the steps of:

capturing, by one or more microphones of at least one voice command device in a plurality of voice command devices, audio signals;

analyzing, by a processor unit of the at least one voice command device in the plurality of voice command devices, the captured audio signals to detect a speech signal, transmitting, to a software-as-a-service (SaaS) provider via a network using a transceiver of the at least one voice command device in the plurality of the voice command devices, first directivity information of at least one source of the detected speech signal with respect to one or more microphones of at least one voice command device in the plurality of voice command devices; and receiving, from the SaaS provider via the network using the transceiver of the at least one voice command device in the plurality of voice command devices, second directivity information of the at least one source of the detected speech signal with respect to the plurality of voice command devices.

18. The one or more non-transitory computer-readable media of claim 17, further comprising at least one of:

(i) selecting, by the SaaS provider and based on the first directivity information, at least one voice command device of the plurality of voice command devices as an active voice command device, and including corresponding selection information in the second directivity information;

(ii) selecting, by the SaaS provider and based on the first directivity information, at least one microphone in the plurality of voice command devices as an active microphone, and including corresponding microphone selection information in the second directivity information; or (iii) determining, by the SaaS provider and based on the first directivity information, beamforming information with respect to at least two microphones in the plurality of voice command devices, and including corresponding beamforming information in the second directivity information.

19. The one or more non-transitory computer-readable media of claim 17, further comprising:

(i) calculating, by the processor unit of the at least one voice command device in the plurality of voice command devices, a signal-to-noise ratio (SNR) for the speech signal with respect to each microphone of the one or more microphones, or with respect to a plurality of different beamforming directions of a plurality of microphones of the at least one voice command device, and including the calculated SNRs in the first directivity information; or (ii) estimating, by the processor unit of the at least one voice command device in the plurality of voice command devices and based on the captured audio signals, direction-of-arrival (DOA) information for the speech signal, and including the estimated DOA information in the first directivity information; or (iii) including the captured audio signals in the first directivity information, and calculating, by the SaaS provider and based on the captured audio signals from at least two voice command devices, DOA information for the speech signal.

20. The one or more non-transitory computer-readable media of claim 17, further comprising:

receiving, from the SaaS provider, an audio service comprising at least one service audio signal; and outputting, based on the received second directivity information, the at least one service audio signal through at least one loudspeaker of the at least one voice command device.

* * * * *